(12) United States Patent
DoVale et al.

(10) Patent No.: US 9,981,608 B1
(45) Date of Patent: May 29, 2018

(54) PICKUP TRUCK SERVICE APPARATUS

(71) Applicants: Jaime DoVale, Melrose, MA (US); Mark D. Lorusso, Portsmouth, NH (US)

(72) Inventors: Jaime DoVale, Melrose, MA (US); Mark D. Lorusso, Portsmouth, NH (US)

( * ) Notice: Subject to any disclaimer, the term of this patent is extended or adjusted under 35 U.S.C. 154(b) by 270 days.

(21) Appl. No.: 13/735,116

(22) Filed: Jan. 7, 2013

Related U.S. Application Data

(60) Provisional application No. 61/583,724, filed on Jan. 6, 2012.

(51) Int. Cl.
| | | |
|---|---|---|
| *B60R 3/00* | (2006.01) | |
| *B60R 9/06* | (2006.01) | |
| *B60R 11/00* | (2006.01) | |
| *B60D 1/58* | (2006.01) | |
| *B60D 1/48* | (2006.01) | |
| *B25H 5/00* | (2006.01) | |

(52) U.S. Cl.
CPC .............. *B60R 3/007* (2013.01); *B60D 1/488* (2013.01); *B60D 1/58* (2013.01); *B60R 3/00* (2013.01); *B60R 9/06* (2013.01); *B60R 11/00* (2013.01); *B25H 5/00* (2013.01)

(58) Field of Classification Search
CPC .. B60R 3/00; B60R 3/007; B60R 9/06; B60R 11/00; B60R 2011/0042; B60R 2011/005; B60D 1/58; B60D 1/488
See application file for complete search history.

(56) References Cited

U.S. PATENT DOCUMENTS

| | | | | |
|---|---|---|---|---|
| 2,106,399 | A * | 1/1938 | Beaumont | B60R 3/00 52/177 |
| 2,378,678 | A * | 6/1945 | Anderson | B60R 3/007 182/150 |
| 3,078,952 | A * | 2/1963 | Kelling | B60R 3/007 182/150 |
| 3,159,242 | A * | 12/1964 | James | B60R 3/007 182/92 |
| 3,357,719 | A * | 12/1967 | McCrea | B60R 3/007 182/92 |
| 3,865,431 | A * | 2/1975 | Zakhi | A47C 15/004 108/44 |
| 4,017,093 | A * | 4/1977 | Stecker, Sr. | B60R 3/00 280/163 |
| 4,057,125 | A * | 11/1977 | Kroft | B60R 3/007 182/206 |

(Continued)

*Primary Examiner* — Colleen M Chavchavadze
(74) *Attorney, Agent, or Firm* — Lorusso & Associates

(57) ABSTRACT

A vehicle service access assembly having features for mounting to tow hooks of a pickup truck or utility vehicle to access the vehicle's engine compartment is disclosed. The assembly includes two tow hook inserts, secured to laterally adjustable components, configured to register against the tow hooks and vehicle frame members to releasably suspend the assembly for use. In other aspects of the disclosure, safety rails may be included to provide an added measure of safety. The assembly may also include a retractable, suspended step to facilitate vertical access to the assembly. In a further aspect, a retractable tool tray provides a secure and convenient means to assemble tools for use in the service of the vehicle.

15 Claims, 47 Drawing Sheets

(56) References Cited

U.S. PATENT DOCUMENTS

| | | | | | |
|---|---|---|---|---|---|
| 4,089,276 | A | * | 5/1978 | Enos | A47B 5/02 |
| | | | | | 108/44 |
| 4,099,760 | A | * | 7/1978 | Mascotte | B60R 19/52 |
| | | | | | 224/402 |
| 4,753,447 | A | * | 6/1988 | Hall | B60R 3/007 |
| | | | | | 182/127 |
| 4,782,916 | A | * | 11/1988 | Hays | B60R 3/007 |
| | | | | | 182/150 |
| 4,785,910 | A | * | 11/1988 | Tonkovich | B60R 3/007 |
| | | | | | 182/61 |
| 4,825,975 | A | * | 5/1989 | Symes | B60R 3/007 |
| | | | | | 182/150 |
| 4,911,264 | A | * | 3/1990 | McCafferty | B60R 3/007 |
| | | | | | 182/150 |
| 4,947,961 | A | * | 8/1990 | Dudley | B60R 3/007 |
| | | | | | 182/150 |
| 6,767,023 | B1 | * | 7/2004 | Nicholson | B60R 3/007 |
| | | | | | 182/127 |
| 2004/0130116 | A1 | * | 7/2004 | Glanert | B60R 3/007 |
| | | | | | 280/163 |
| 2007/0007073 | A1 | * | 1/2007 | Keller | E06C 5/00 |
| | | | | | 182/115 |
| 2016/0185273 | A1 | * | 6/2016 | Aftanas | B65G 69/30 |
| | | | | | 280/164.1 |

* cited by examiner

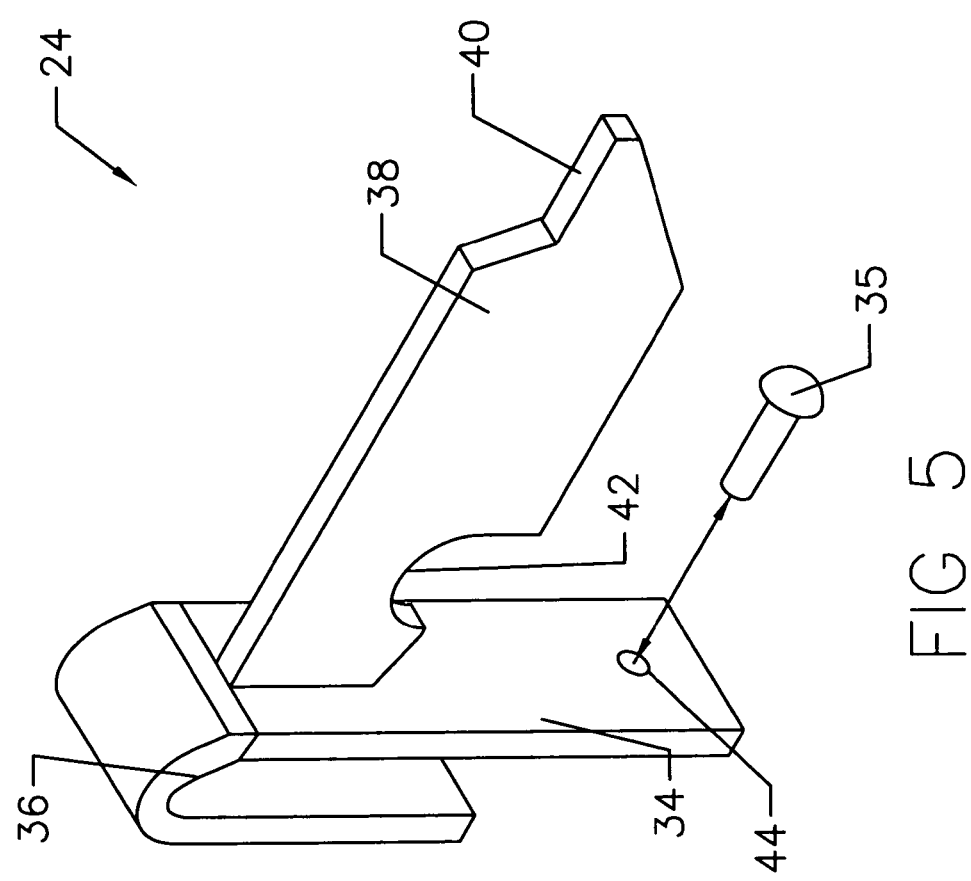

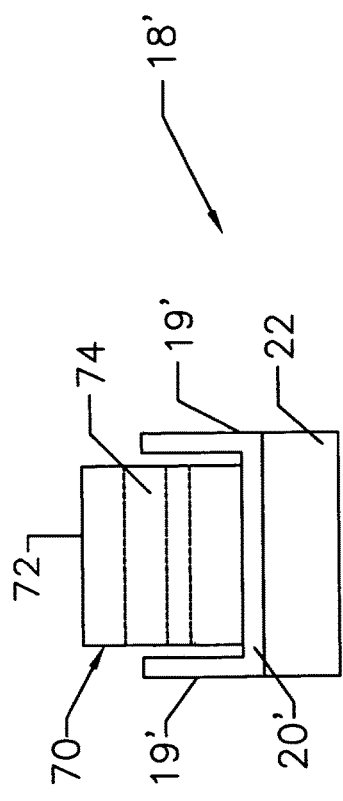
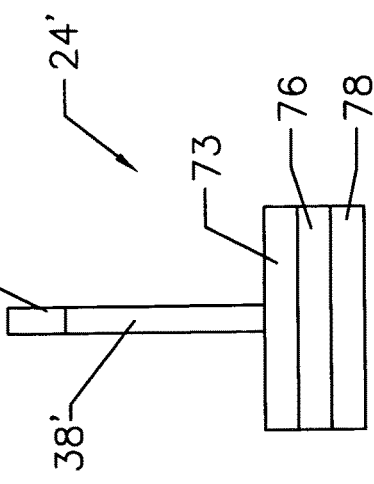
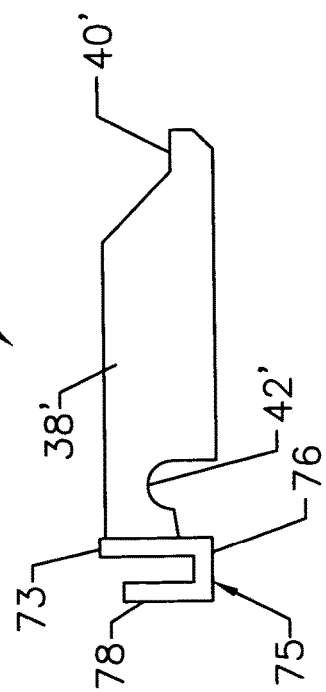
FIG 36
FIG 35
FIG 34

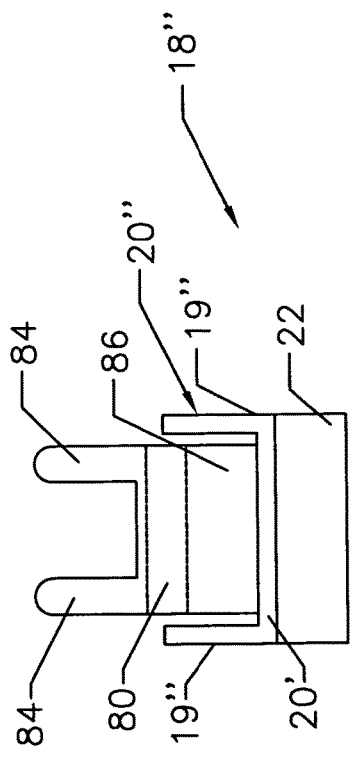
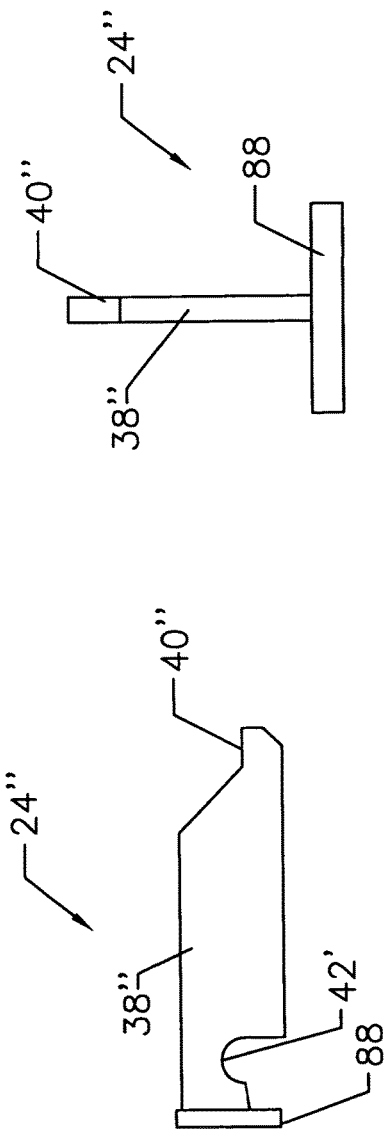

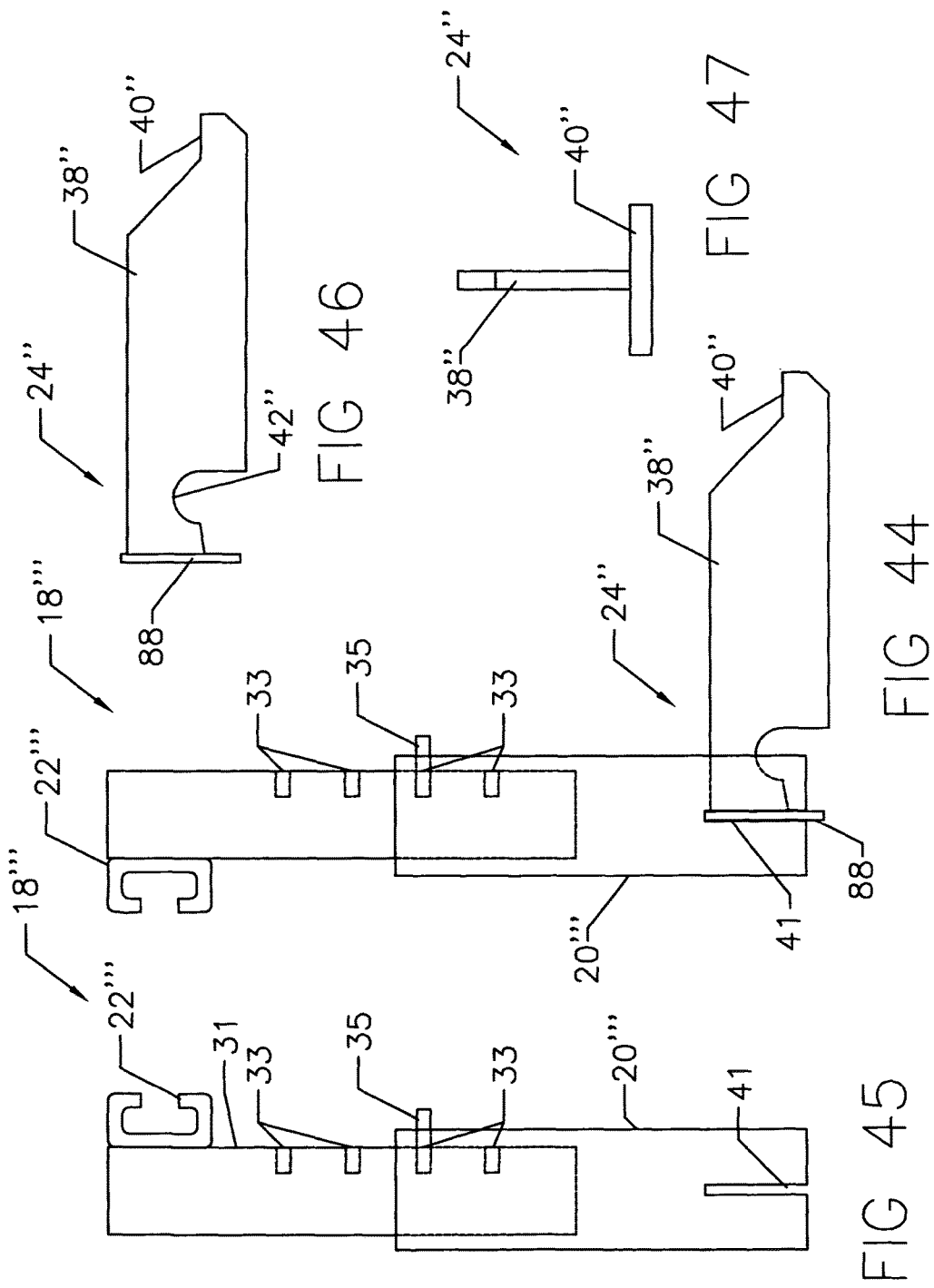

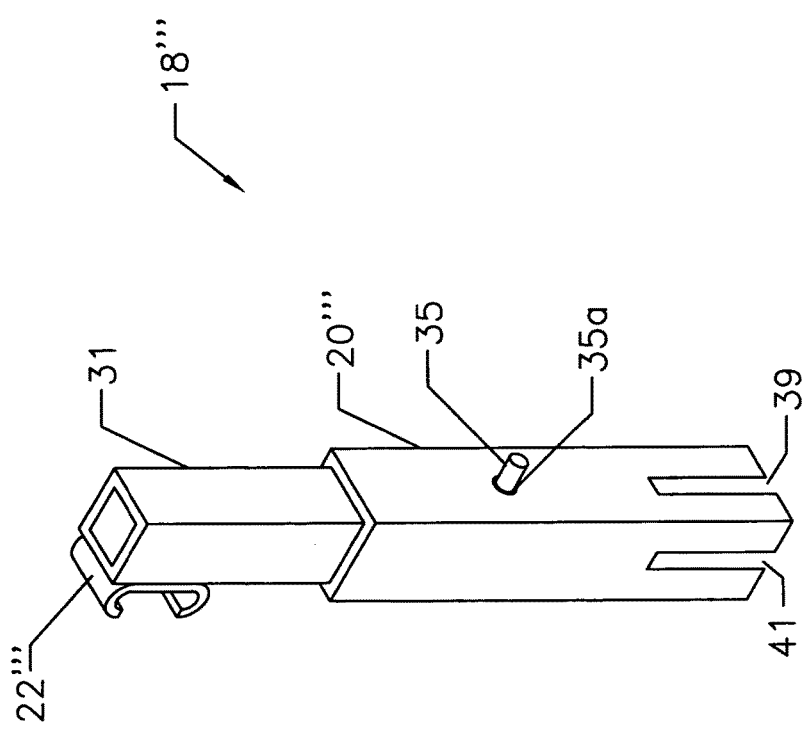

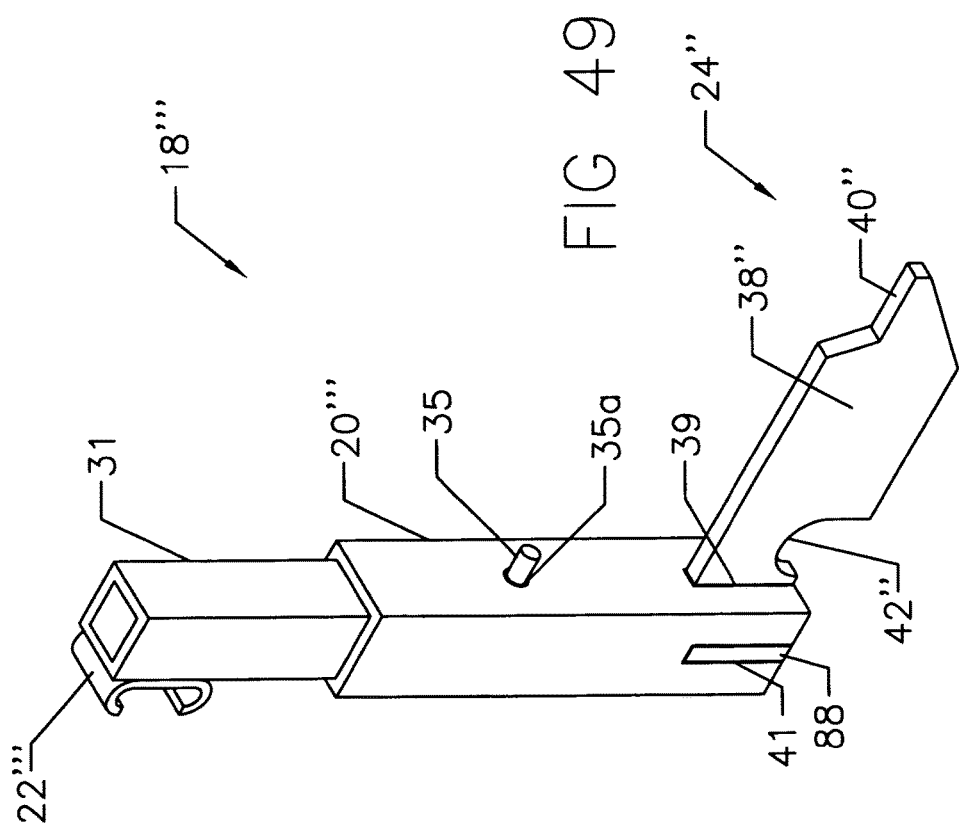

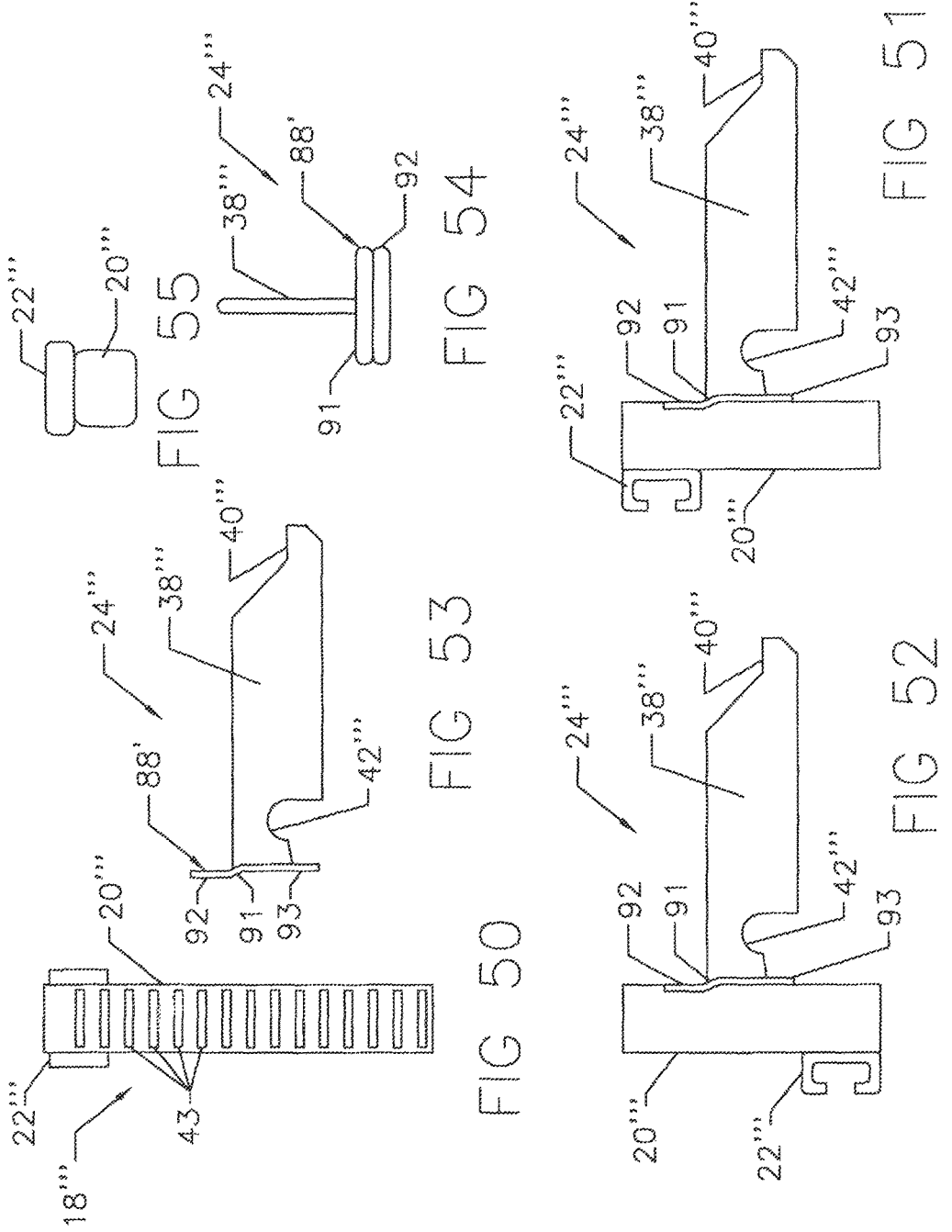

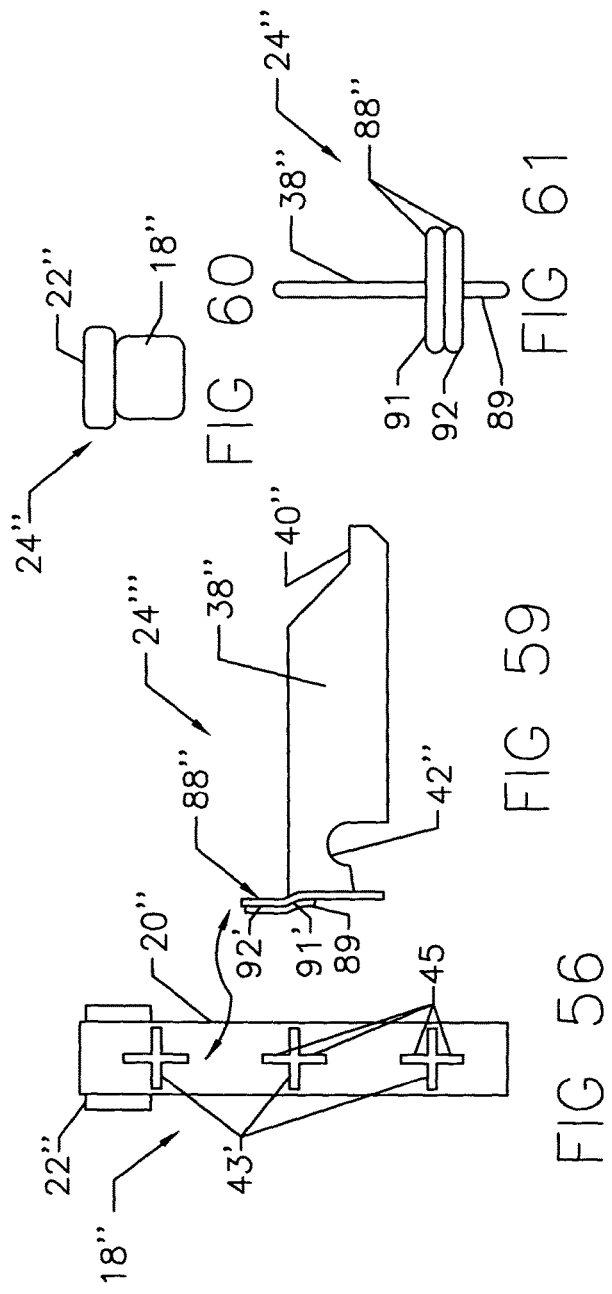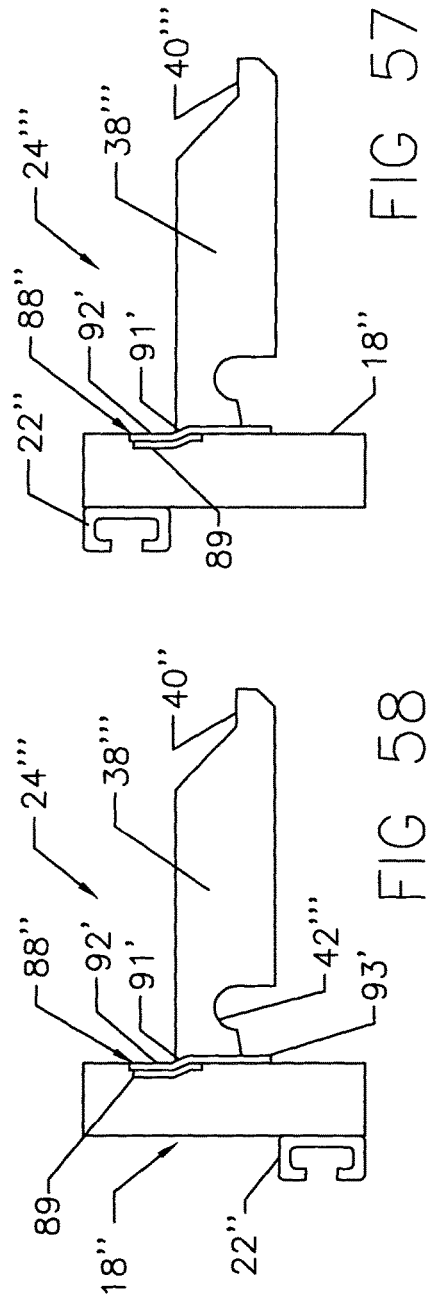

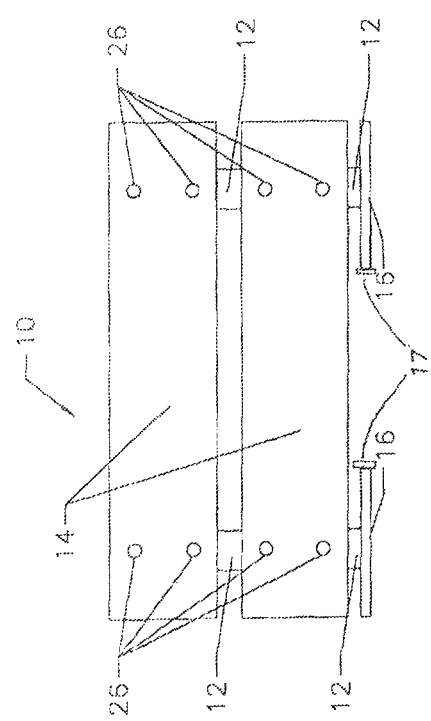

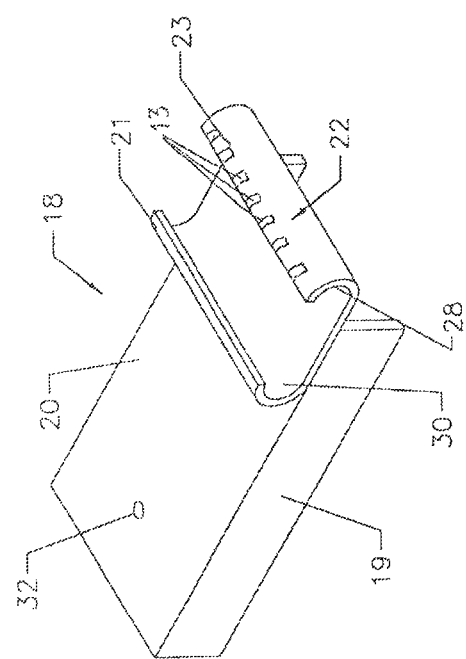

PICKUP TRUCK SERVICE APPARATUS

CROSS REFERENCE TO RELATED APPLICATION

A claim of priority is made to U.S. Provisional Application Ser. No. 61/583,724, filed Jan. 6, 2012, the contents of which are incorporated in their entirety by reference.

Field of the Invention

This disclosure relates to apparatus for servicing pickup truck engine compartments. The apparatus provides a safe, secure means to reach components positioned in the engine compartment of large pickup trucks. More particularly, the disclosure relates to apparatus for facilitating physical access to pickup truck engine compartments so as to improve efficiency, serviceability and safety when servicing relatively large pickup trucks.

Background of the Disclosure

Pickup trucks have been employed for decades by consumers and professionals for a wide variety of activities. Throughout that time, manufacturers have dramatically increased the size and power of these vehicles. As part of that advancement, engine compartments have gotten larger and taller to accommodate larger engines and engine accessories. To service some of the late model vehicles, e.g., the Ford F-250, mechanics have had to adapt various apparatus to gain access to all areas and components under a pickup truck hood. Everything from milk crates, joint compound buckets set on their rims, step stools, staging and ladders have been used to gain access to the vehicle's engine compartment.

As many an unfortunate mechanic has discovered, many of these devices used to solve the problem of engine compartment access create hazards that do not exist for vehicles having lower hoods and engine compartments. Milk crates, buckets and the like provide a relatively small surface area to set one's foot and can easily tip when one's weight is shifted despite placement on smooth, level surfaces constructed from stable slip-free floors. The presence of slippery, soiled (oil and other automotive fluids) and uneven surfaces add to the hazards these solutions present.

Step stools and step ladders—although more stable than buckets and milk crates—are cumbersome and limit engine compartment access due to their spatial orientation and construction. Uneven surfaces and surfaces soiled with oil and other automotive fluids increase the instability of these access devices.

With the exception of step stools with tool trays, none of these access approaches have features to support the numerous tools a mechanic needs to perform the needed repair or diagnostic operations. Instead, specially adapted covers are used to prevent damage to the vehicle's finish and tool boxes and tool trays have to be placed in close proximity to the work area to allow ready access to the needed tools. Absent rails or other safety features. the combination of access devices and storage boxes create further hazardous situations.

What is needed is an apparatus to permit unfettered improved access to large utility and pickup truck vehicles that provides the needed stability and safety features to ensure safe, effective access to engine compartment components. These and other objects of the disclosure will become apparent from a reading of the following summary and detailed description of the disclosure.

Summary of the Disclosure

In one aspect of the disclosure, a suspended vehicle access platform includes a pair of tow-hook-engaging subassemblies to provide a cantilever-like support system to function as a work platform. The platform is formed on two substantially parallel rails to which one or more boards are secured. Each rail has additional components to allow engagement with two tow hooks extending from a front end of a pickup truck. The additional components include features for lateral adjustability to accommodate tow hooks having different spacing.

In a further aspect of the disclosure, safety rails are disposed on the platform to provide an added measure of safety to the configuration. The safety rails may be permanent or removable. The rails may also be adjustable for height via telescopic components or concentric tubes with spaced bores and locking pins. In a yet further aspect of the disclosure, a foldable tool tray is secured to at least one of the safety rails to provide a support surface for tools and other items needed to perform auto repairs.

In a still further aspect of the disclosure, a retractable step may also be included to facilitate access to the work platform. In an alternate embodiment, the step may be fixed. To provide even greater access to the engine compartment, an additional step may be secured above the platform. These and other aspects of the disclosure will become apparent from a review of the appended drawings and a reading of the following detailed description of the disclosure.

BRIEF DESCRIPTION OF THE DRAWINGS

FIG. 5 is a top perspective view of a platform hanger according to the embodiment of the disclosure shown in FIG. 1.

FIG. 34 is a side view of a platform hanger according to the embodiment of the disclosure shown in FIG. 30.

FIG. 35 is a top view of the platform hanger shown in FIG. 34.

FIG. 36 is a top view of the platform support shown in FIG. 32.

FIG. 41 is a side view of the platform hanger shown in FIG. 40.

FIG. 42 is a top view of the platform hanger shown in FIG. 41.

FIG. 43 is a top view of the platform support shown in FIG. 39.

FIG. 44 is a side elevational view in partial phantom of a platform support/platform hanger subassembly according to another embodiment of the disclosure.

FIG. 45 is a side elevational view in partial phantom of a platform support according to the embodiment shown in FIG. 44.

FIG. 46 is a side view of a platform hanger according to one embodiment of the disclosure.

FIG. 47 is a top view of the platform hanger shown in FIG. 46.

FIG. 48 is a top side perspective view of a platform support according to the embodiment of the disclosure shown in FIG. 44.

FIG. 49 is a top side perspective view of a platform support platform hanger subassembly according to the embodiment of the disclosure shown in FIG. 44.

FIG. 50 is a front elevational view of a platform support according to a further embodiment of the disclosure.

FIG. 51 is a side elevational view of a platform support/platform hanger with the platform hanger configured according to the embodiment of the disclosure shown in FIG. 50.

FIG. 52 is a side elevational view of a platform support/platform hanger with the platform support configured according to the embodiment of the disclosure shown in FIG. 50 and rotated upside down.

FIG. 53 is a side view of a platform hanger according to the embodiment of the disclosure shown in FIG. 50.

FIG. 54 is a top view of the platform hanger shown in FIG. 53.

FIG. 55 is a top view of the platform hanger shown in FIG. 54.

FIG. 56 is a front elevational view of a platform support according to a yet further embodiment of the disclosure, FIG. 57 is a side elevational view of a platform support/platform hanger subassembly with the platform support configured according to the embodiment of the disclosure shown in FIG. 56.

FIG. 58 is a side elevational view of a platform support/platform hanger subassembly with the platform support configured according to the embodiment of the disclosure shown in FIG. 56 and oriented upside down.

FIG. 59 is a side view of a platform hanger according to a yet further embodiment of the disclosure.

FIG. 60 is a top view of the platform hanger shown in FIG. 59.

FIG. 61 is a top view of the platform support shown in FIG. 56.

FIG. 62 is a lop view of a platform subassembly with slide plate stops according to another embodiment of the disclosure.

FIG. 63 is a top perspective view of a platform support with notches formed in a channel flange according to a further embodiment of the disclosure.

DETAILED DESCRIPTION OF THE DISCLOSURE

Figure 1:
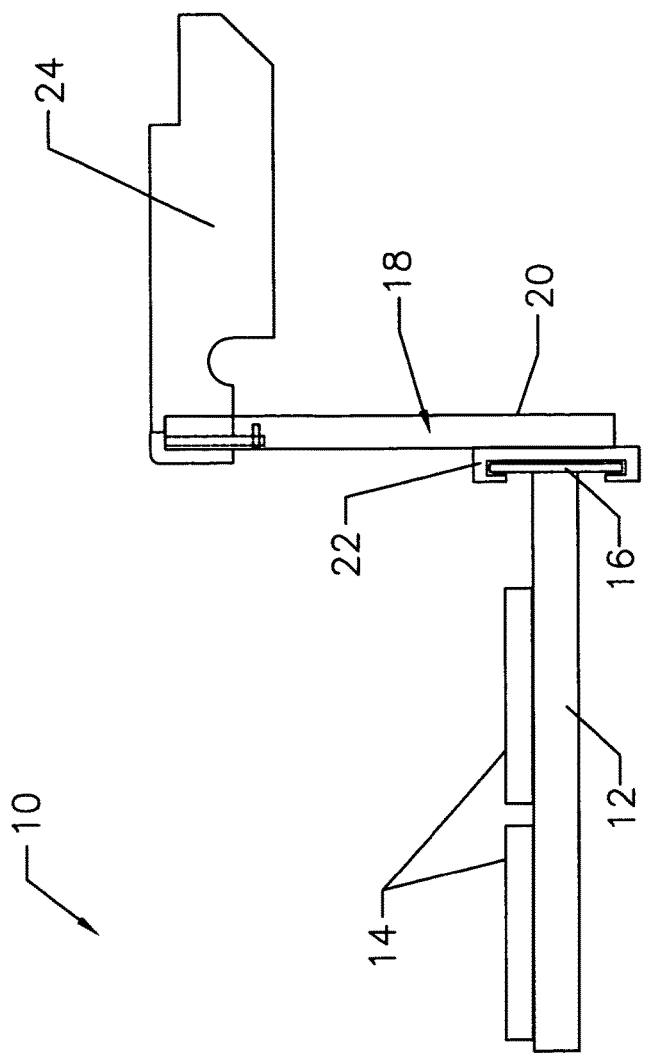
FIG. 1 is a side sectional view in partial phantom of a service platform assembly according to one embodiment of the disclosure.
Figure 2:
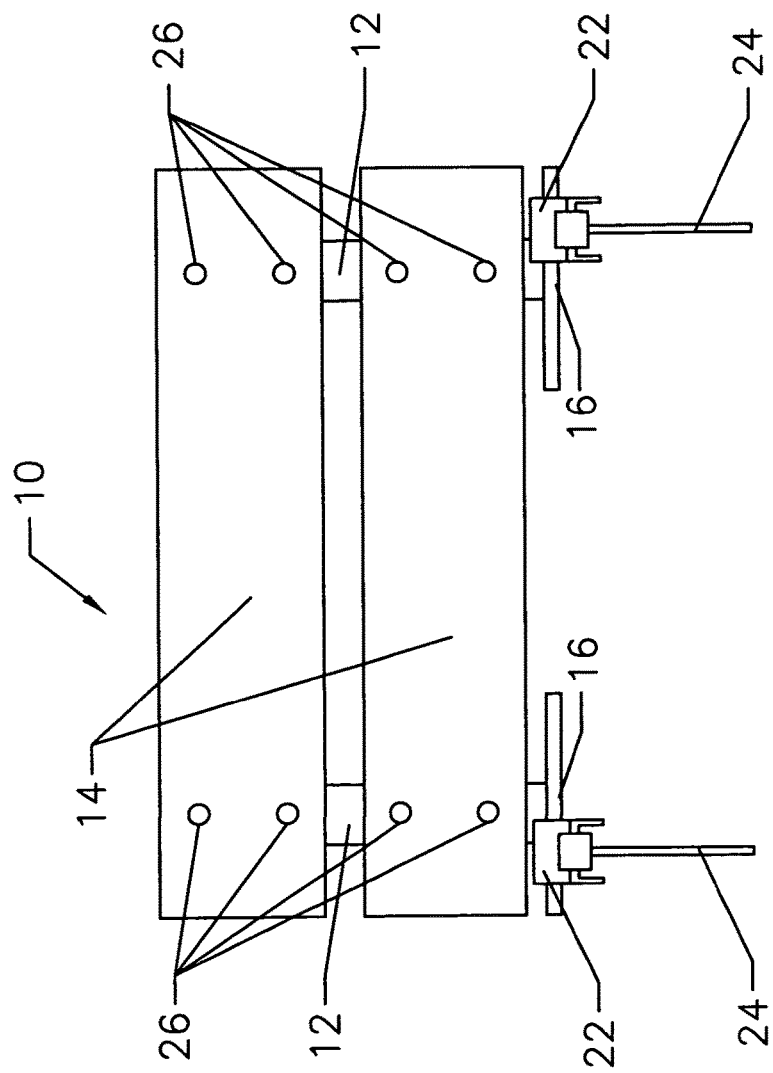
FIG. 2 is a top view of the service platform assembly shown in FIG. 2.
Figure 3:
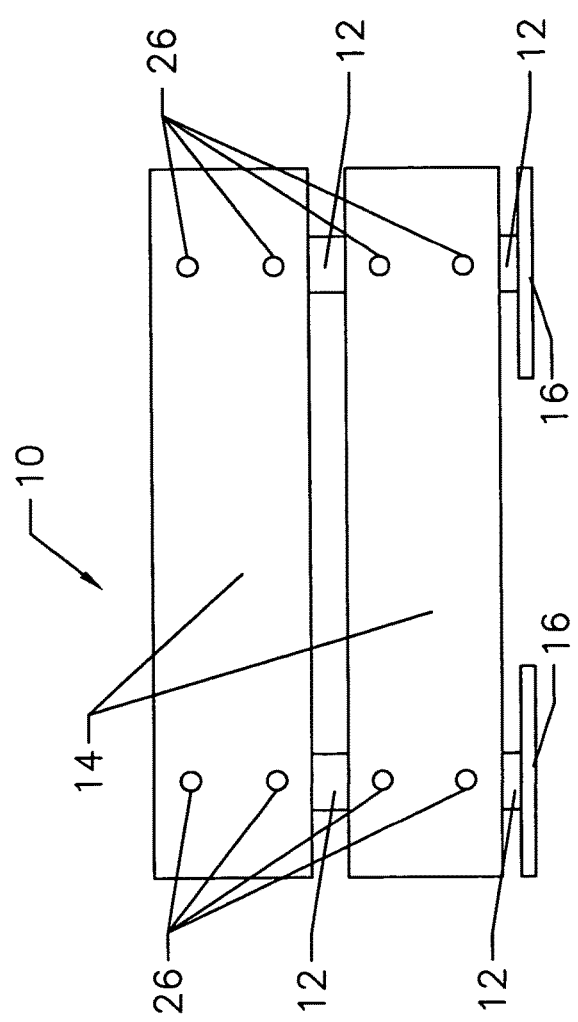
FIG. 3 is a top view of a platform subassembly according to the embodiment of the disclosure shown in FIG. 1.

Referring to FIGS. 1, 2, 23 and 24, a service platform assembly shown generally as 10, includes a pair of platform support rails 12 positioned to be substantially parallel. At least one platform tread 14 is secured to a top surface of support rails 12. Tread 14 may be secured with one of a number of methods well known in the art including, but not limited to, mechanical fasteners (shown as 26), welding and adhesives. Mechanical fasteners may include nut and bolt assemblies, lock nuts, threaded screws and the like. Adhesives may include polymer varieties including urethanes as well as aliphatic and aromatic resins.

Secured to a proximal end of rails 12 is slide plate 16. Plate 16 provides a support surface for the sliding elements of the assembly. Plate 16 may be secured to rails 12 via welding or mechanical fasteners. If mechanical fasteners are used, the fasteners must be either countersunk or dimensioned so as not to restrict the relative lateral movement of the slide plate within a slide channel described and disclosed below. Both rails 12 and plate 16 may be formed from tubular steel and plate steel, respectively. Alternatively, the components may be constructed from engineering grade plastics and formed as a single piece. The combination of the rails, tread(s) and plates form a platform subassembly.

To secure the platform subassembly to a vehicle's tow hooks, a platform suspension subassembly is used. Platform suspension subassembly includes a substantially vertically oriented support bar 18 and a tow hook insert 24. As shown in FIGS. 1, 2, 4 and 8, support bar 18 includes beam 20 and slide channel 22. Channel 22 is an elongate segment secured to beam 20 via welding or mechanical fasteners, Alternatively, beam 20 and channel 22 may be made as a single piece with engineering grade plastics or similar materials.

Figure 64:
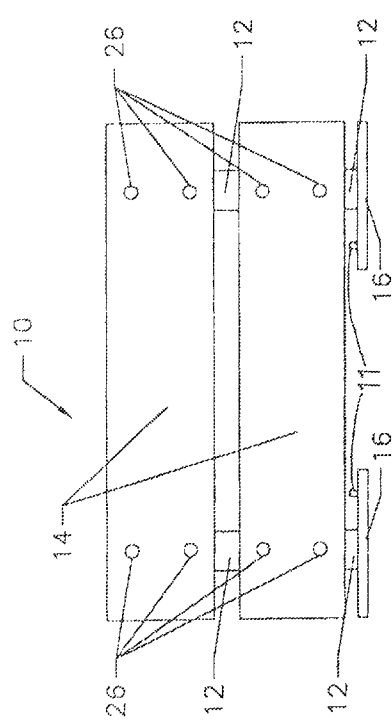
FIG. 64 is top view of a platform subassembly with tabs formed on the slide plates according to the embodiment of the disclosure shown in FIG. 63.
Figure 65:
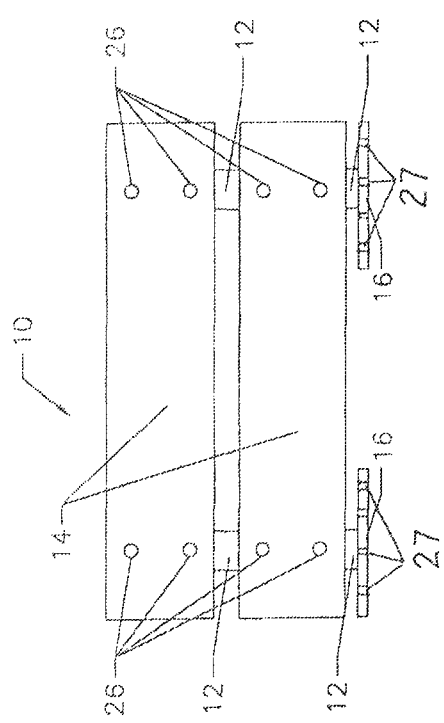
FIG. 65 is a top view of a platform subassembly with holes formed in the slide plates according to a still further embodiment of the disclosure.
Figure 66:
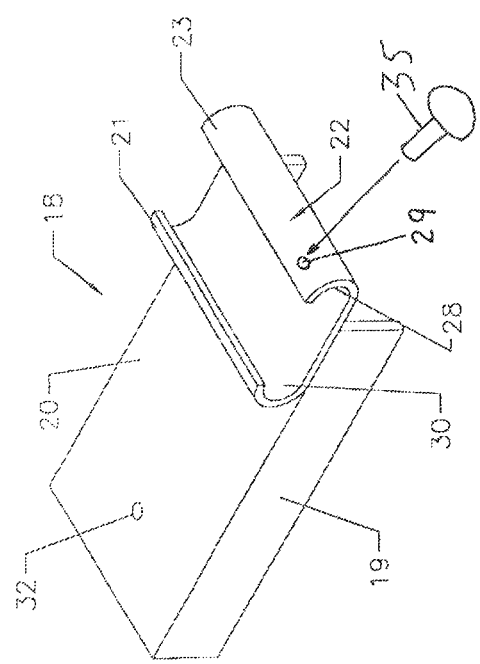
FIG. 66 is a top perspective view of a platform support with a hole formed in a channel flange and a pin to secure the lateral orientation of the platform support to the slide plate embodiment shown in FIG. 65.

Channel 22 includes two elongate channel flanges 21 and 23 that partially define the open channel. Channel 22 is dimensioned to receive slide plate 16 so a to allow the free movement of slide plate 16 within channel 22. To limit the potential travel of support bar 18 along slide plate 16, stops 17 may be built into, or secured to plate 16 that restrict movement within channel 22 as shown in FIG. 62. Alternative features may be used to positively, but releasably lock the orientation of support bar 18 to slide plate 16 such as notches 13 formed on one of the component and tabs 11 formed on the other to provide lock-and-key-type mechanical engagement such as shown in FIGS. 63 and 64. In a further embodiment, holes, 27 and 29, may be formed in both components in which a pin 35 is inserted and secured to releasably lock the lateral spatial orientation of the two components as shown in FIGS. 65 and 66.

In use, when weight is placed on the platform subassembly, a back top edge of slide plate 16 registers against the back of top flange 21 and a front bottom edge of slide plate 16 registers against a back surface of channel 22. A bottom edge of slide plate 16 registers against a bottom surface of channel 22 and functions as the main support surface for the platform subassembly. Channel 22 may be formed with a lubricious coating or lining to improve lateral movement of the registered components. Alternatively, a friction bearing material may be used as a lining to restrict lateral movement while in use.

In one embodiment, beam 20 has a pair of lateral flanges 19 extending from each side so as to increase the structural integrity and strength of beam 20. Alternatively, beam 20 may be constructed from a resilient bar stock of sufficient thickness to withstand the forces applied to the bar when the platform assembly is in use. One quarter inch steel stock is sufficient to meet the structural requirements absent flanges 21.

Figure 4:
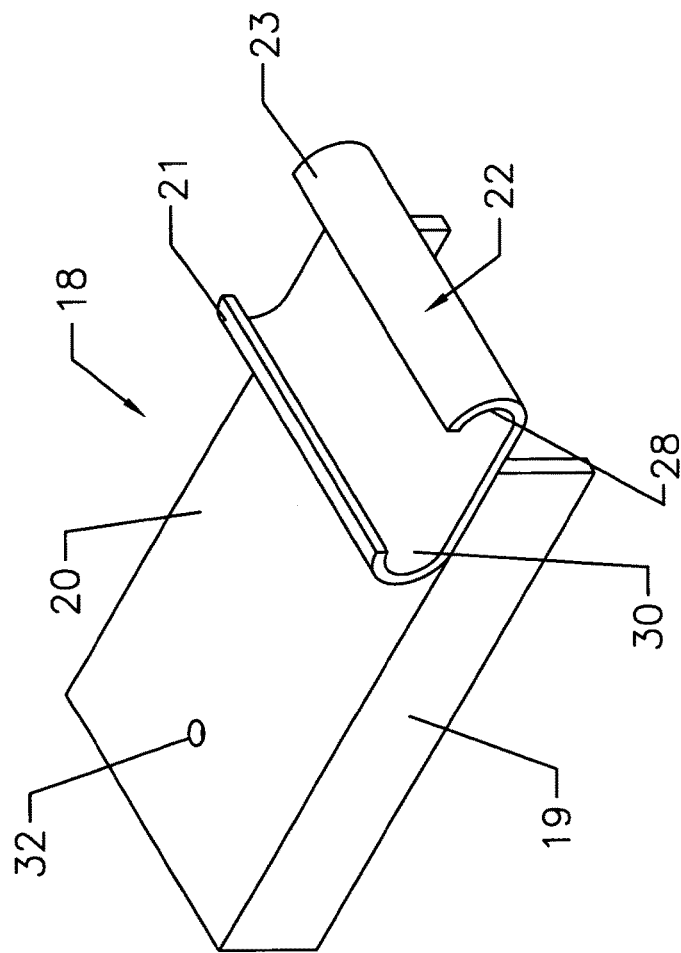
FIG. 4 is a top perspective view of a platform support according to the embodiment of the disclosure shown in FIG. 1.
Figure 7:
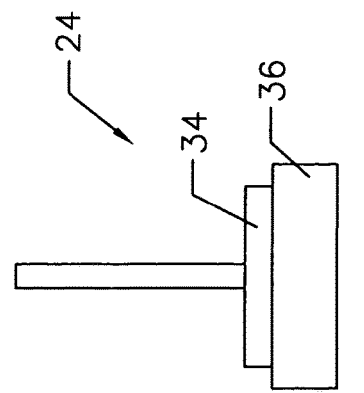
FIG. 7 is a top view of a platform hanger according to the embodiment of the disclosure shown in FIG. 1.
Figure 8:
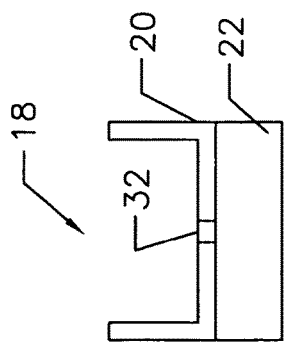
FIG. 8 is a top view in partial phantom of a platform support according to the embodiment of the disclosure shown in FIG. 1.
Figure 6:
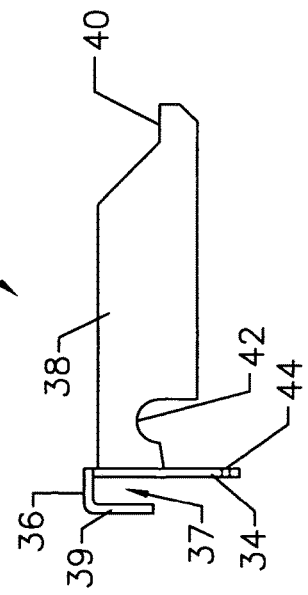
FIG. 6 is a side sectional view in partial phantom of a platform hanger according to the embodiment of the disclosure shown in FIG. 1.

With the flange embodiment as shown in FIGS. 4 and 8, beam 20 has portions defining beam bore 32 configured to receive a retaining pin (not shown). The retaining pin secures the spatial orientation of support bar 20 and tow hook insert 24. A bottom end is secured to channel 22 via welding, adhesive and/or mechanical fasteners.

Referring now to FIGS. 1 and 5-7, tow hook insert 24 is the primary component used to engage the tow hooks of a pickup truck. Insert 24 includes a main insert body 38 that carries the bulk of the support assembly load. A front end 40 includes a vehicle frame engagement surface 40 configured to register against a tow hook support beam 64. A bottom edge of main body 38 has portions defining a radiused hook engagement surface 42 configured and dimensioned to register against a top surface of a tow hook 66. The spacing of surface 42 and surface 40 is set to ensure sufficient engagement of surface 40 against support beam 64 to displace the force along support surface 40. Body 38 further includes a sloping top surface 37 that reduces the vertical height of body 38 toward surface 40 so as to provide spatial clearance from vehicle components surrounding the tow hook/tow hook support beam assembly. Surfaces 40 and 42 may be covered or coated with a force absorbing and/or scuff resistant material such as foam rubber, rubberized paint and the like to protect the finish of the two hooks and tow hook support beams.

The thickness of body 38 has to be sufficient to support the remaining components of the assembly as well as any person utilizing the assembly. To that end, ¼ inch steel is sufficient to meet the strength requirements for insert 24. Similar considerations have to be given should the component be made from engineering grade plastics as is well known in the art.

Secured to a back end of main body 38 is an insert base plate 34. Base plate 34 is elongate and may extend below a bottom edge of main body 38. A back side of base plate 34 provides a registration surface for engagement with support bar 18 when engaged to insert 24. The relatively extended length of plate 34 provides a stabilizing effect on the spatial orientation of insert 24 and support bar 18, and disperses the forces exerted by the remaining components and users along its length. Base plate 34 may be secured to main body 38 via welding, adhesives, mechanical fasteners and the like. Alternatively, plate 34 and main body 38 may be formed as a single molded unit if engineered materials are used as is well known in the art.

Secured to a top end of plate 34 is an insert flange 36. Flange 36 is configured and dimensioned to receive a top end of support bar 18. A top portion of flange 36 extends backwardly from, and substantially orthogonal to, plate 34. If formed from a single piece of material, a back end of flange 36 extends downwardly and substantially parallel to the plane occupied by plate 34. The combination of flange 36 and plate 34 forms a slot dimensioned to receive support bar 18. The dimensional tolerances are set so as to minimize the amount of play between the two components so as to maximize the stability of the assembly. Plate 34 also has portions defining a plate bore 44 dimensioned and configured to receive a pin 35 used to secure insert 24 to support bar 18. The configuration requires pin 35 to support the weight of the platform subassembly as well as support bar 18. Alternative configurations are disclosed herein below.

Referring now to FIGS. 30-36, in another aspect of the disclosure, the interlocking features of support bar 18 and insert 24 are modified to eliminate the need to support the weight of the platform assembly with pins 35. The service platform assembly, shown generally as 10''', includes substantially the same features as assembly 10. A modified support bar 18' includes portions defining a hook plate 25 configured to releasably interlock with features of a modified tow hook insert 24' described more fully below.

Hook plate 25 defines a channel that opens downwardly relative to the orientation of support bar 18'. The channel is dimensioned and configured to receive substantially mirror image components o an insert hook plate 34 secured to insert 24' described below. Hook plate 25 also has portions defining a hook plate bore 32' dimensioned and configured to receive pin 36. Hook plate 25 may be secured to bar 18' via wilding, adhesives, mechanical fasteners and the like. In the embodiment shown in FIGS. 30 and 32, hook plate 25 is configured in the shape of an "L." with the shorter arm secured to the longitudinal front surface of support bar 18'. Alternatively, hook plate 25 may be configured in the shape of a square upside down "U" with one of the parallel arms secured to support bar 18' using one of the attachments methods disclosed.

Figure 33:
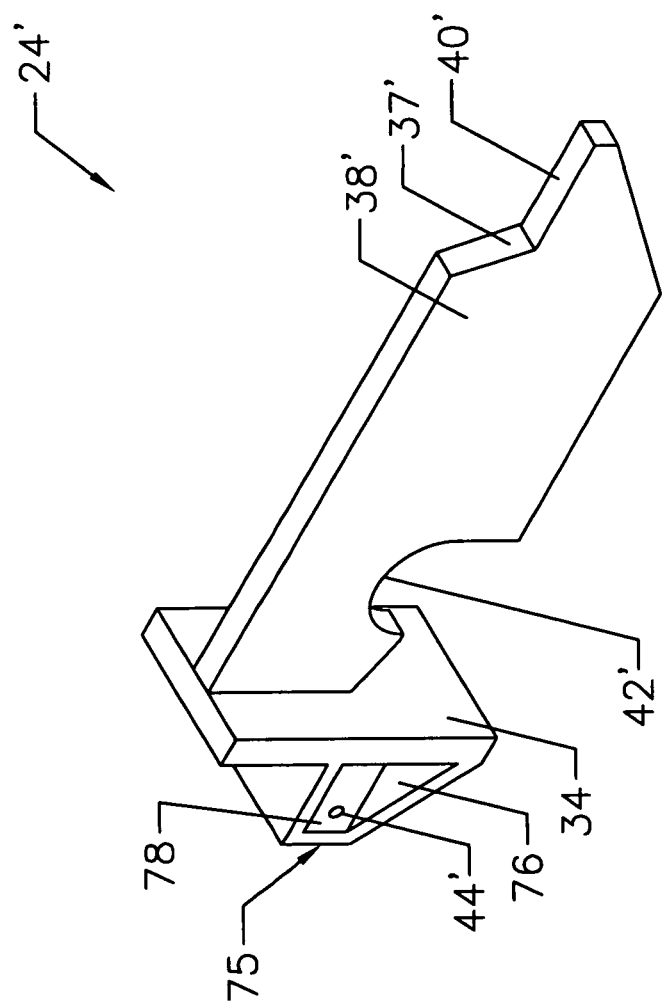
FIG. 33 is a bottom side perspective view of a platform hanger according to the embodiment of the disclosure shown in FIG. 30.

Referring again to FIG. 30 and particularly to FIGS. 33-35, tow hook insert 24' includes insert base plate 34. Plate 34 may be secured to body 38' via welding, adhesives, mechanical fasteners and the like. Plate 34 has an extension 75 that includes a bottom segment 76 that extends from a bottom back side of plate 34 and a vertical segment 78 that together define an insert channel. Vertical segment 78 has portions defining an insert bore 44' dimensioned and configured to receive pin 35.

To assemble support bar 18' and tow hook insert 24', vertical segment 78 is placed in the channel formed by hook plate 25. The pieces are adjusted laterally to align bore 32' with bore 44'. Pin 35 is inserted into the aligned bores to releasably lock the spatial orientation of the components. This configuration places the majority of the weight of the assembly and the weight of anyone using the assembly on extension 75 and hook plate 25. In this embodiment, pin 35 simply secures the lateral orientation of the support bar 18' and insert 24'.

Referring now to FIGS. 37-42, in a yet further aspect of the disclosure, another modification of support bar 18 and insert 24 provides a means to increase the robustness of the structure and eliminates the need for pin 35. In this embodiment, shown generally as 10'''', the main features of the service platform assembly are substantially the same as those for service platform assembly 10. Referring now to FIGS. 30-36, in another aspect of the disclosure, the interlocking features of support bar 18 and insert 24 are modified to eliminate the need to support the weight of the platform assembly with pins 35. The service platform assembly, shown generally as 10''', includes substantially the safe features as assembly 10. A modified support bar 18'' includes portions defining a hook plate 80 configured to releasably interlock with features of a modified tow hook insert 24'' described more fully below.

Hook plate 80 defines a channel that opens downwardly relative to the orientation of support bar 18''. The channel is dimensioned and configured to receive an insert base plate 88 secured to insert 24'' described below. In this embodiment, hook plate 80 includes a back plate 86 secured to a top back surface of support bar 18''. Extending forward from a top end of back plate 86 is top segment 82. Extending downwardly from a front end of segment 82 are two tabs 84. The combination of back plate 84, top segment 82 and tabs 84 define a lateral slot dimensioned and configured to receive base plate 88. A gap defined between tabs 84 is dimensioned and configured to receive main body 38'' of insert 24''. Hook plate 80 may be secured to bar 18'' via welding, adhesives, mechanical fasteners and the like.

Figure 37:
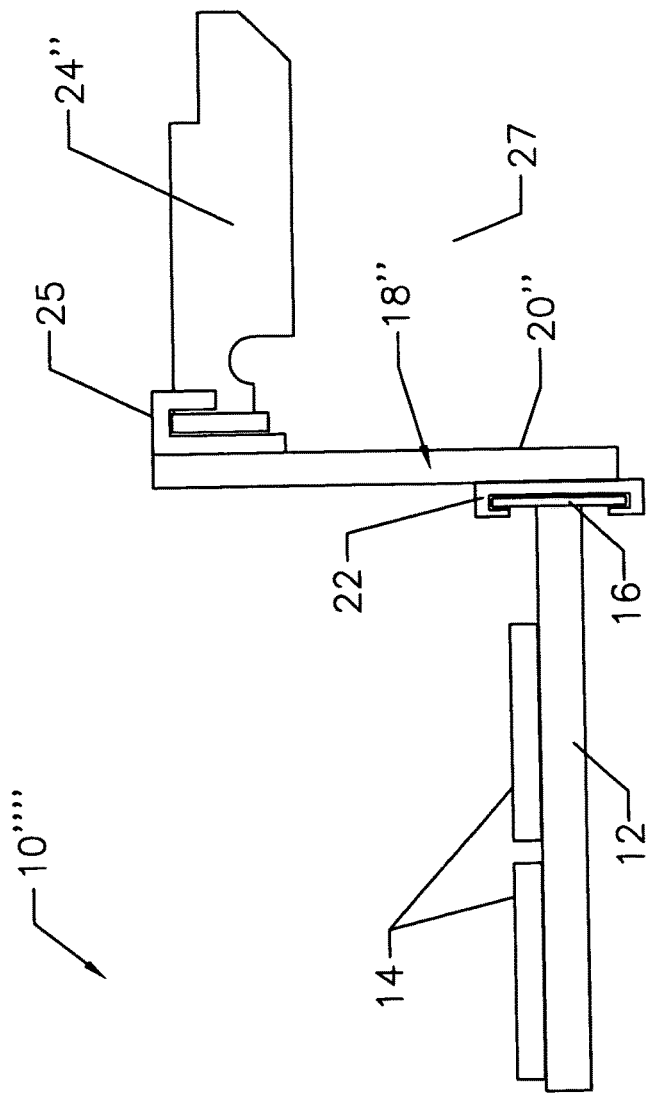
FIG. 37 is a side elevational view of a platform assembly according to a yet further embodiment of the disclosure.
Figure 38:
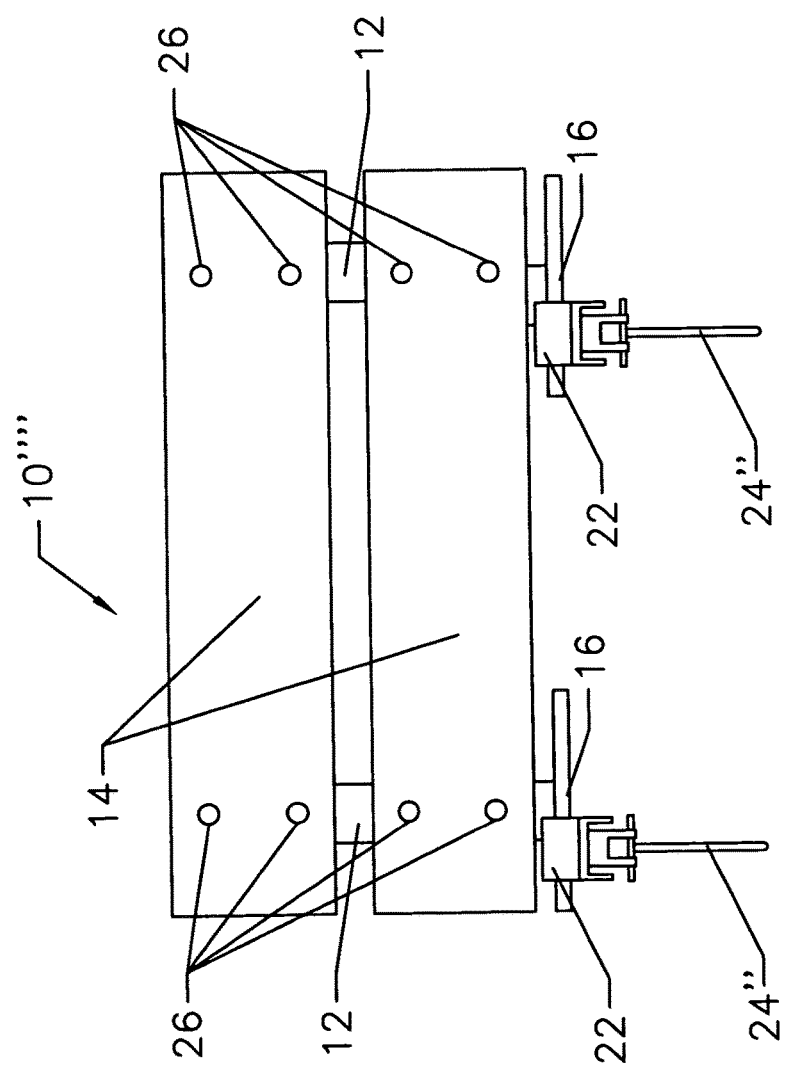
FIG. 38 is a top view of a platform subassembly according the embodiment of the disclosure shown in FIG. 37.
Figure 39:
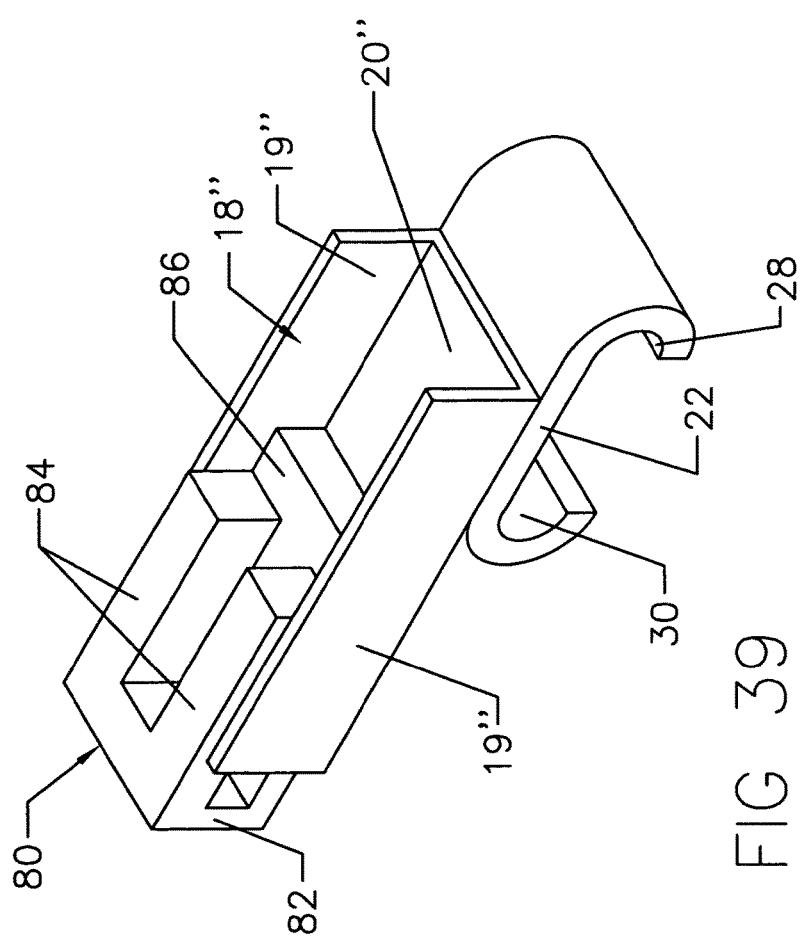
FIG. 39 a back side elevational view of a platform support according to the embodiment of the disclosure shown in FIG. 37.

In the embodiment shown in FIGS. 37 and 39, hook plate 80 is configured in the shape of a modified square upside down "U" with one segmented arm formed by tabs 84 and an un-segmented arm formed by back plate 86 secured to the longitudinal front surface of support bar 18''. Alternatively, hook plate 80 may be configured in the shape of an down "L" with the elimination of back plate 86 and with the short arm (represented by top segment 82 secured at are end to the front surface of support bar 18'' and the long arm represented by tabs 84.

Figure 40:
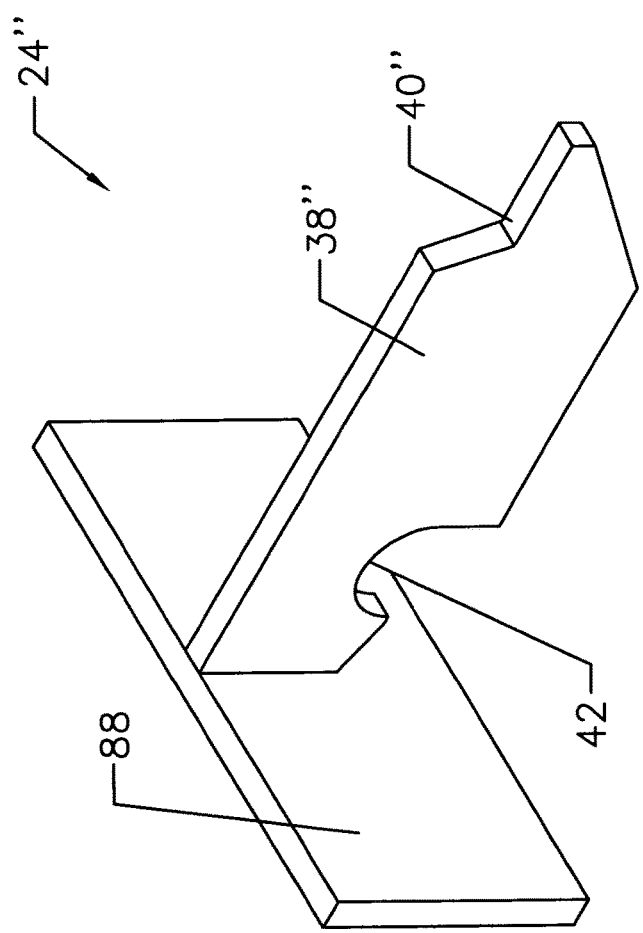
FIG. 40 is a side perspective view of a platform hanger according to the embodiment of the disclosure shown in FIG. 37.

Referring again to FIG. 37 and particularly to FIGS. 40-42, tow hook insert 24'' includes insert base plate 88. Plate 88 may be secured to body 38'' via welding, adhesives, mechanical fasteners and the like. Unlike prior embodiments, plate 88 does not require the inclusion of a bore to receive pin 35, The unique "T" configuration of plate 88 and main body 38'' provides structural features that allow for the engagement of support bar 18'' and insert 24'' without the need for pin 35.

To assemble support bar 18'' and tow hook insert 24'', base plate 88 is inserted into the channel formed by hook plate 80. If inserted correctly, main body 38'' inters the groove defined by tabs 84. This configuration locks the components together both vertically and laterally. Because this embodiment locks the lateral orientation of the components, pin 35 is not needed. This configuration places the majority of the weight of the assembly and the weight of anyone using the assembly on hook plate 80 and base plate 88.

Referring now to FIGS. 44-49, in a further aspect of the disclosure, the platform support is modified with telescopic elements to impart adjustability to the apparatus. In this embodiment, platform support, shown generally as 18''', includes support main body 20''' fabricated from tubular steel or like material is configured with a series of slots at a bottom end to receive elements of platform hanger 24''. Side slots 41 are formed on opposing sides of body 20''', and dimensioned and configured to receive base plate 88. A front slot 39 is formed on a front surface of body 20''', and dimensioned and configured to receive platform hanger main body 38. The combined registration of main body 38 and base plate 88 in the slots locks the hanger in the platform support.

A support extension 31 is fabricated from tubular steel or like material, or made be fabricated from a solid material. The element does not have to be hollow to function as an extension. The cross-sectional dimensions of extension 31 are sized to allow the extension to slide freely within main body 20'''. Channel 22 is secured to an upper end of extension 31 opposite the side from which platform hanger 24'' extends. A series of spaced bores 33 provide anchor points to orient the height of extension 31 relative to main body 20'''. One or more main body through bores 35a are formed in one or more sides of main body 20'''to correspond to bores 33.

To adjust the height of the platform support, extension 31 is extended from, or retracted into, main body 20''' until the desired height is achieved and one bore 33 and one through bore 35a are aligned. Once aligned, a platform support pin 35 is inserted into the aligned bores to secure the relative orientation of extension 31 to main body 20'''. To re-adjust the height, pin 35 is removed and the extension is extended or retracted to a different height orientation. As should be understood, pin 35 can be configured in a number of ways including formed with a finger grip and/or with a flange that registers against the outer surface of main body 20''' when the pin is inserted into bore 35a to set the insert distance of pin 35.

Referring now to FIGS. 50-55, in a still further aspect of the disclosure, the platform support is modified with a plurality of hanger slots 43 dimensioned and configured to receive a modified platform hanger shown generally as 24'''. In this embodiment, the platform support, shown generally as $18^{iv}$, includes slots 43 formed along a front face of the platform support. Similar to the embodiment shown in FIG. 44, the support includes support main body $20^{iv}$ fabricated from tubular steel or like material. A channel 22 is secured to an upper end of main body $18^{iv}$ on a side opposite the side in which sots 43 are formed.

In this embodiment, platform hanger 24''' has a main body 38''', a support surface 40''' and an engagement surface 42''' similar to the elements for platform hanger 24. A base plate, shown generally as 88' has a bottom section 93 secured to main body 38'''. A middle section 91 extends away from the hanger main body to create a registration surface against which a bottom surface of one of the slots 43 will register. Extending upwardly from a distal end of middle section 91 is base plate tab 92. Tab 92 is dimensioned and configured for insertion into a slot 43. To assemble hanger 24''' to platform support 18''', the hanger is advanced toward the support so as to insert tab 92 into one of the slots 43. To begin the insertion, the hanger is rotated so the tab is aligned at an angle to the slot to facilitate insertion. As the tab is inserted into the platform, the distal end of the hanger is rotated downwardly until a back surface of bottom section 93 registers against the outer wall of support 18'''. To remove the hanger, the insertion sequence is reversed with the distal end of the hanger counter-rotated to facilitate removal of tab 92. By placing hanger 24''' in different slots 43, the height of the apparatus relative to the vehicle can be adjusted, An additional advantage of this embodiment is the capability of support 18''' to be rotated 180° top to bottom to allow for further height adjustment variability. Slots 43 are symmetrical about a horizontal centerline to permit use in either orientation. As should be understood, the number of slots includes in the support and the location of the slots is entirely variable and may be configured in numerous configurations so as to remain within the scope and spirit of the disclosure.

Referring now to FIGS. 56-61, in a yet further aspect of the disclosure, a platform support, shown generally as $18^v$, includes a plurality of modified slots 43' to improve the structural integrity of the junction of the platform to the hanger. This embodiment is substantially the same as the embodiment shown in FIGS. 50-55 with two notable exceptions. First, slots 43' include vertical slot extensions 45 extending from the top and bottom of slots 43'. And second, the platform hanger, shown generally as $24^{iv}$, has a modified base plate. A base plate, shown generally as 88'', is modified to include support rib 89. Support rib 89 provides additional structural support to counteract the torsional forces applied to tab 92 when an individual steps on the apparatus.

Platform support $18^v$ includes a main body $20^v$ with a channel $22^v$ secured to an upper end on a face opposite the front face in which slots 43' are formed. Slot extensions 45 are formed on the top and bottom edges of slot 43' to provide the same advantageous adjustability of platform support $18^{iv}$. The slot extensions are configured and dimensioned to receive support ribs 89 when hanger $24^{iv}$ is secured to support 18'.

Base plate 88'' has a bottom section 93' secured to main body $38^{iv}$. A middle section 91' extends away from the hanger main body to create a registration surface against which a bottom surface of one of the slots 43' will register. Extending upwardly from a distal end of middle section 91' is base plate tab 92'. Tab 92' is dimensioned and configured for insertion into a slot 43'. Rib 89 is formed on, or secured to, a back side of base plate 88''.

The method used to engage hanger $24^{iv}$to support $18^v$ is essentially the same as the method used to secure hanger 24''' to support $18^{iv}$. To assemble hanger $24^{iv}$ to platform support $18^v$, the hanger is advanced toward the support so as to insert tab 92' into one of the slots 43'. To begin the insertion, the hanger is rotated so the tab is aligned at an angle to the slot to facilitate insertion. As the tab is inserted into the platform, the distal end of the hanger is rotated downwardly until a back surface of bottom section 93' registers against the outer wall of support $18^v$. As tab 92' advances into the slot, rib 89 enters into corresponding slot extension 45 and substantially fills the extension as hanger $24^{iv}$ is rotated downwardly into its operational position. To remove the hanger, the insertion sequence is reversed with the distal end of the hanger counter-rotated to facilitate removal of tab 92'. By placing hanger $24^{iv}$ in different slots 43', the height of the apparatus relative to the vehicle can be adjusted.

The additional advantages of the embodiment shown in FIGS. 50-55 is retained in this embodiment as support $18^v$ can also be rotated 180° top to bottom to allow for further height adjustment variability. Slots 43' and slot extensions 45 are collectively symmetrical about a horizontal centerline to permit use in either orientation. As should be understood in similar fashion to the prior embodiment, the number of slots included in the support and the location of the slots is entirely variable and may be configured in numerous configurations so as to remain within the scope and spirit of the disclosure.

Figure 9:
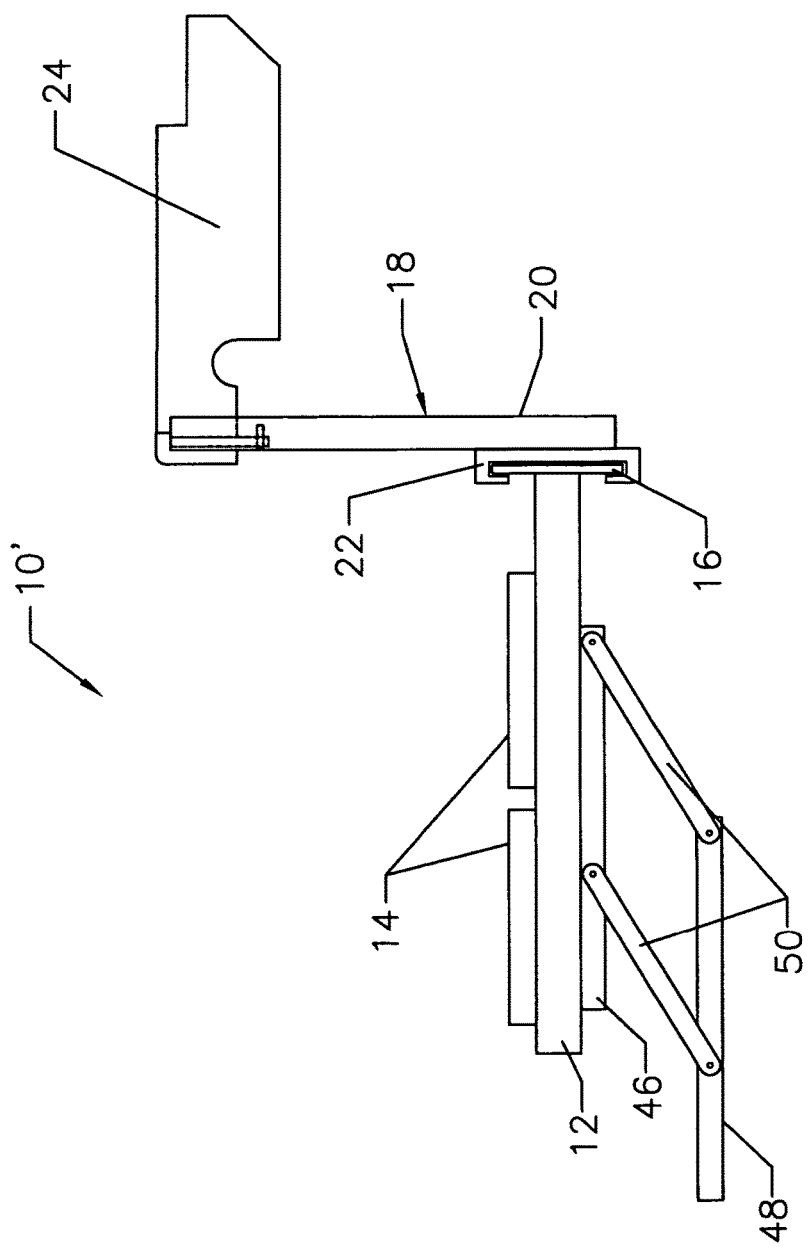
FIG. 9 is a side sectional view in partial phantom of a service platform assembly having an extendable step in an extended position according to another embodiment of the disclosure.
Figure 10:
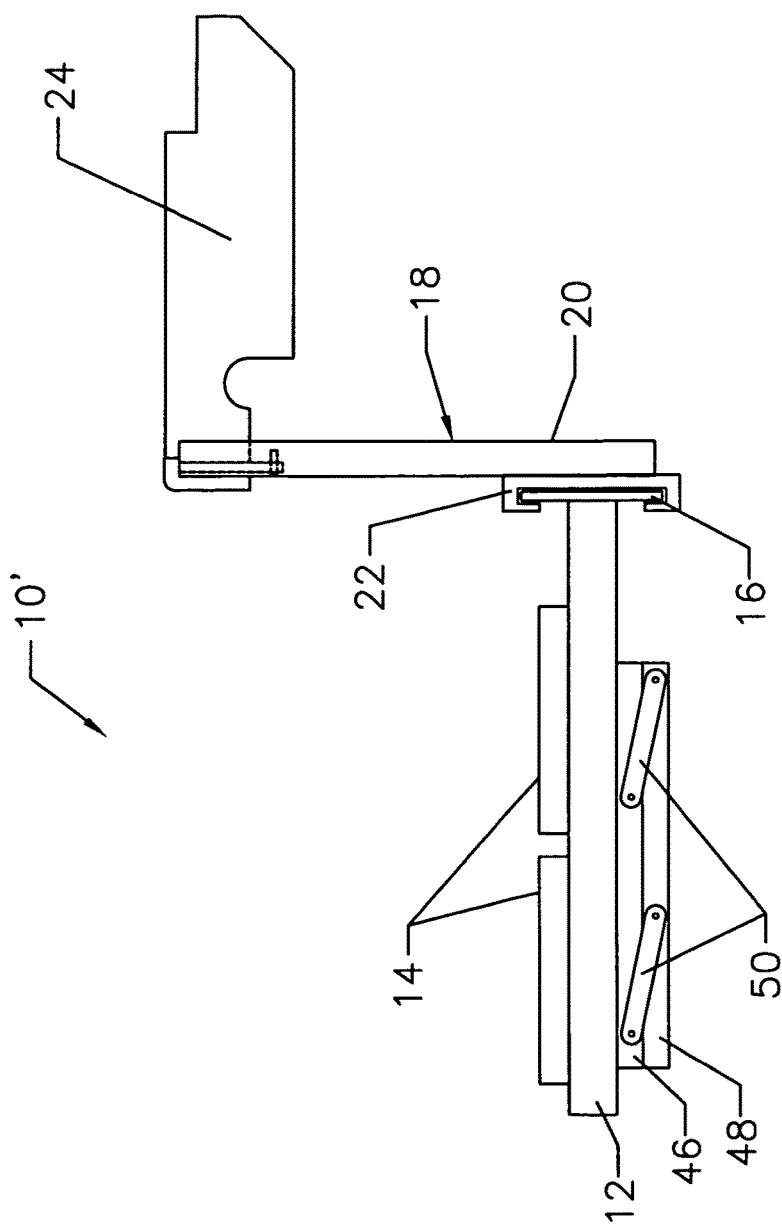
FIG. 10 is a side sectional view in partial phantom of a service platform assembly having an extendable step in a retracted position according to the embodiment of the disclosure shown in FIG. 9.

Referring now to FIGS. 9 and 10, a service platform assembly variation, shown generally as 10' includes the same features described for service platform assembly 10 with the addition of a retractable step 48 included to facilitate access to the service platform main support surface comprised of treads 14. It should be understood that elements referenced with primed numbers in one embodiment correspond to elements in other embodiments with the same unprimed or differently primed numbers. In one embodiment, a hinge support rail 46 is secured either to the bottom, or to a side of each rail 12. At least one hinge 50 is secured to support rail 46 and step 48 on each end of step 48. In the embodiment shown, two hinges 50 are secured to each end of step 48. This provides a more stable configuration relative to a single hinge configuration. Hinges 50 may be rigid, or include one or more articulating joints, such as those used for hinges on a step ladder as is well known in the art. Additional features can be added to releasably lock step 48 in a down position (FIG. 9), or a retracted storage position (FIG. 10). Hinges 50 may be secured to rail 46 and step 48 with mechanical fasteners that allow for the rotation of hinges 50 relative to rail 46 and step 48.

Figure 11:
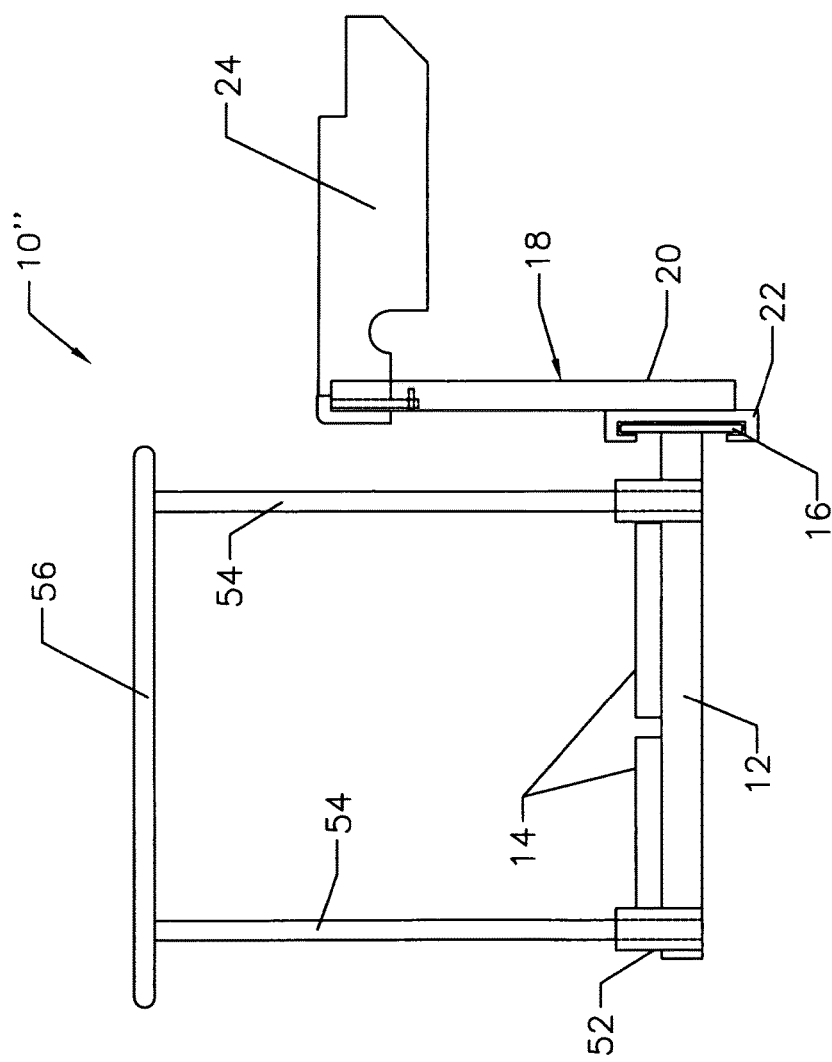
FIG. 11 is a side sectional view in partial phantom of a service platform assembly with safety rails according to a further embodiment of the disclosure.
Figure 12:
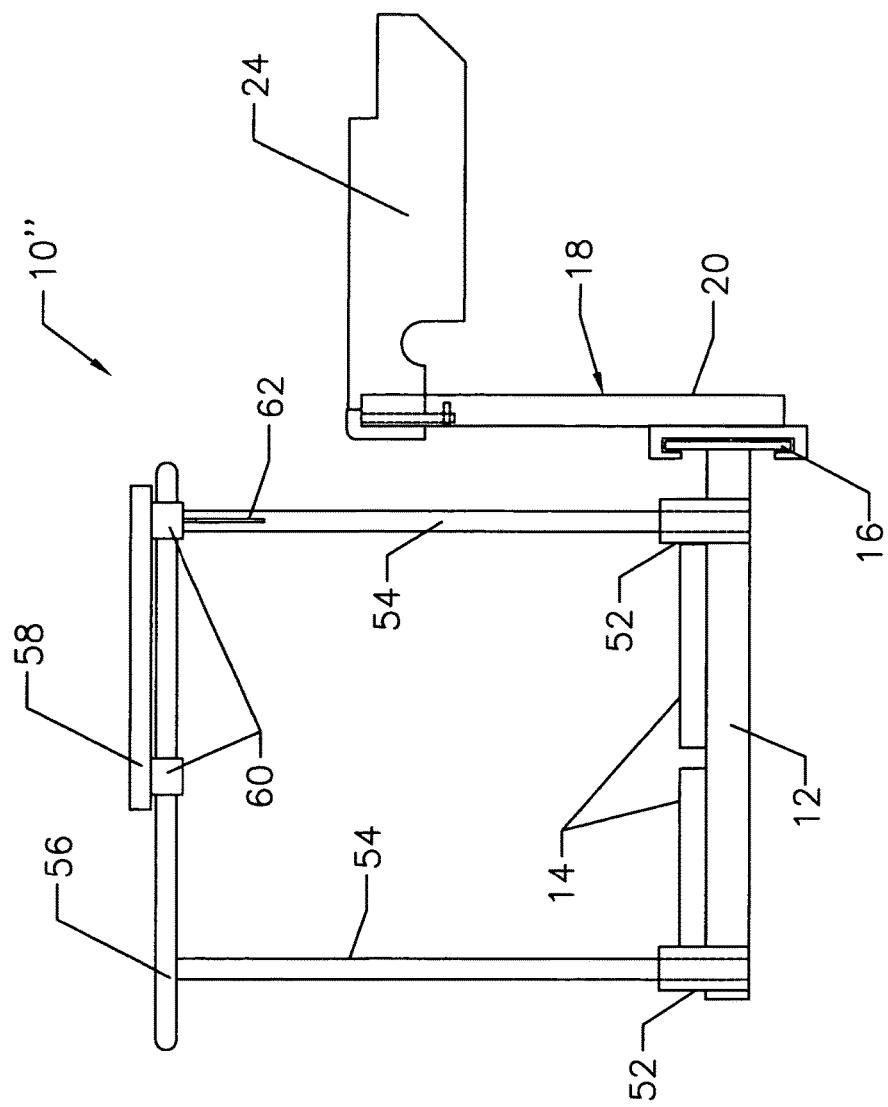
FIG. 12 is a side sectional view in partial phantom of a service platform assembly with safety rails and a tool tray according to a yet further embodiment of the disclosure.
Figure 13:
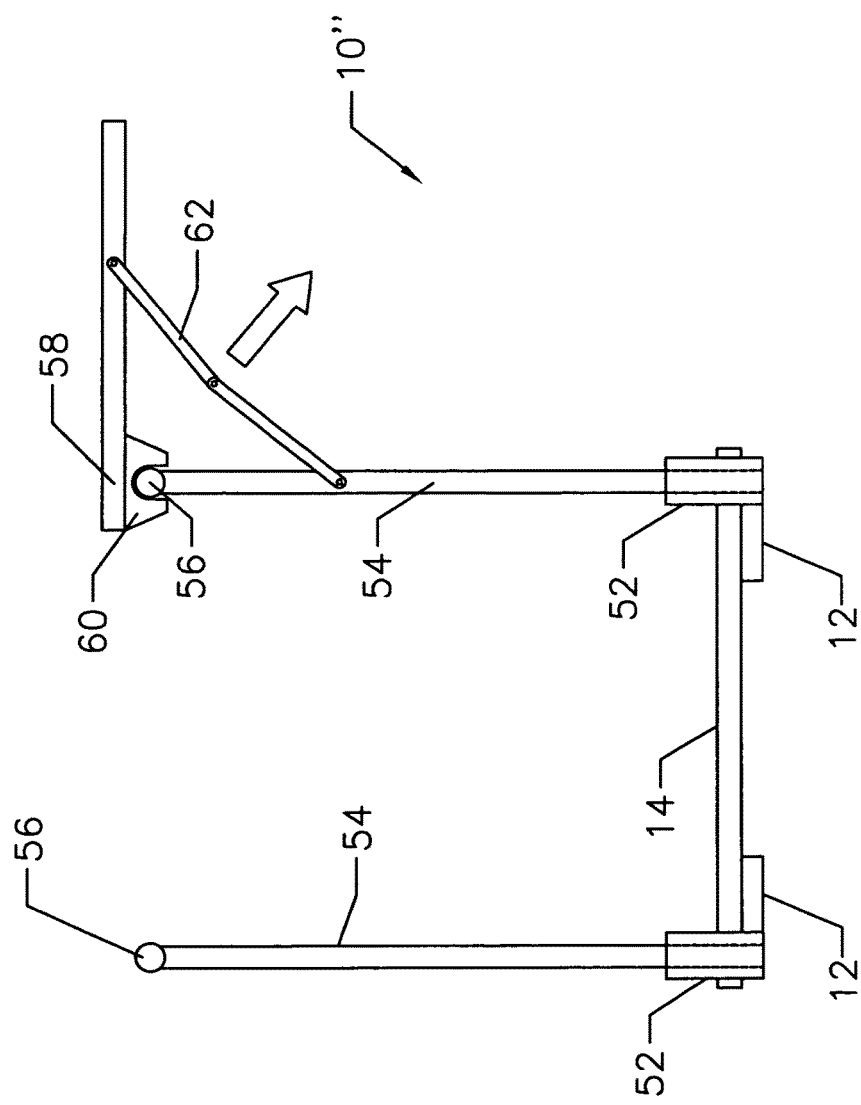
FIG. 13 is a front elevational view in partial phantom of a service platform assembly with safety rails and a tool tray in an extended position according to the embodiment of the disclosure shown in FIG. 12.

In another aspect of the disclosure, to improve the safety of the service platform assembly, safety rails may be incorporated into the assembly as shown generally as 10" in FIGS. 11-13. In one embodiment, rail anchors 52 are secured to rails 12 at four corners of the platform subassembly. Anchors 52 may be configured as substantially hollow cylinders dimensioned and configured to receive safety posts 54. Anchors 52 may have closed bottom ends to act as vertical stops for posts 54. Mechanical fasteners, welding, adhesives and the like may be used to secure anchors 52 to rails 12, methods well known in the art.

Posts 54 may be constructed from tubular steel materials, engineering grade plastics and the like. The cross-sectional diameter of each post is set to allow insertion of the post into anchor 52. Posts 54 may be secured to anchors 52 with nothing more than the force of gravity, or may secured with mechanical fasteners, wedges and the like. Use of nonpermanent fixture means allows for the safety rail system to be removed from the assembly for storage and/or transportation purposes.

Secured to the tops of adjacent posts 54 are safety rails 56. Rails 56 may be secured to posts 54 via mechanical fasteners, adhesives, welding and the like. Either or both posts 54 and rails 56 may be formed with fastening components such as screw or bolt flanges to receive and secure the adjoining parts. Posts 54 may be further modified to be telescopically extendable and retractable with optional height variation segments by incorporating a series of bores and bore inserts into the concentric segments as is well known in the art.

Figure 28:
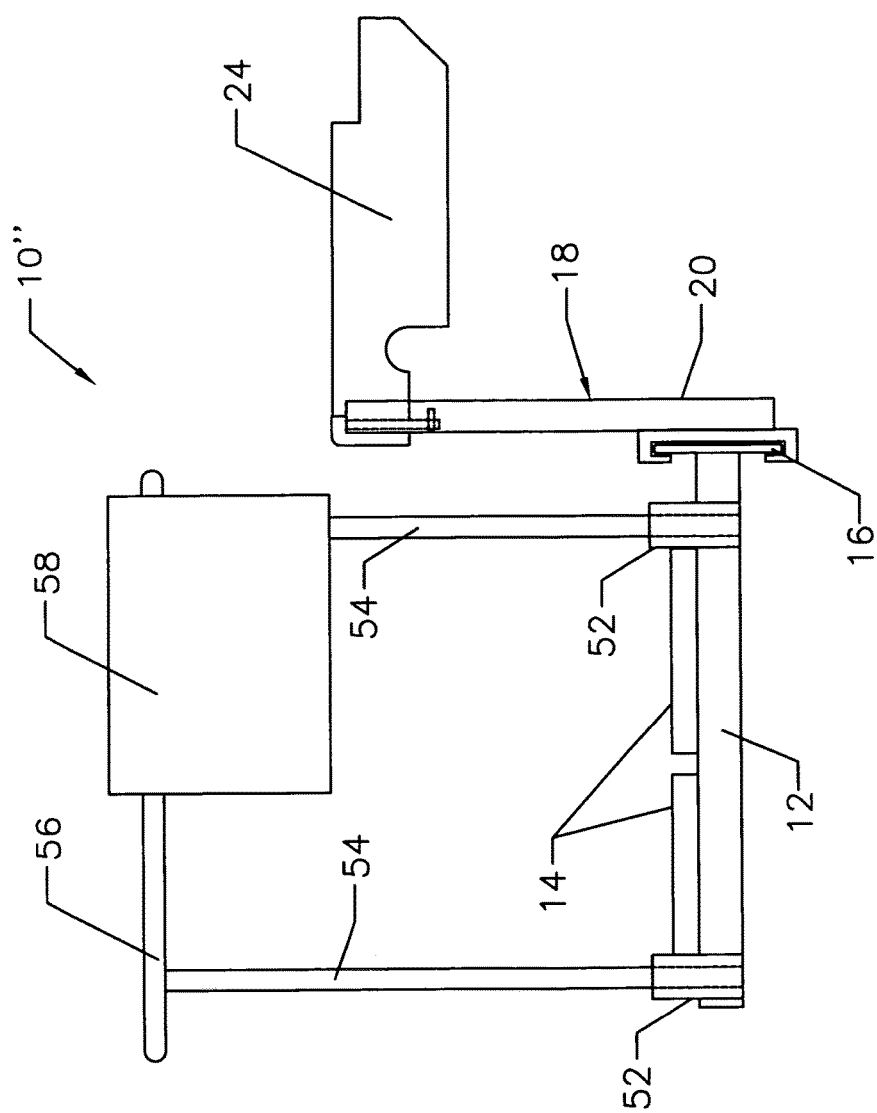
FIG. 28 is a side view in partial phantom of a service platform with safety rails and a tool tray in a retracted position according to the embodiment of the disclosure shown in FIG. 12.
Figure 29:
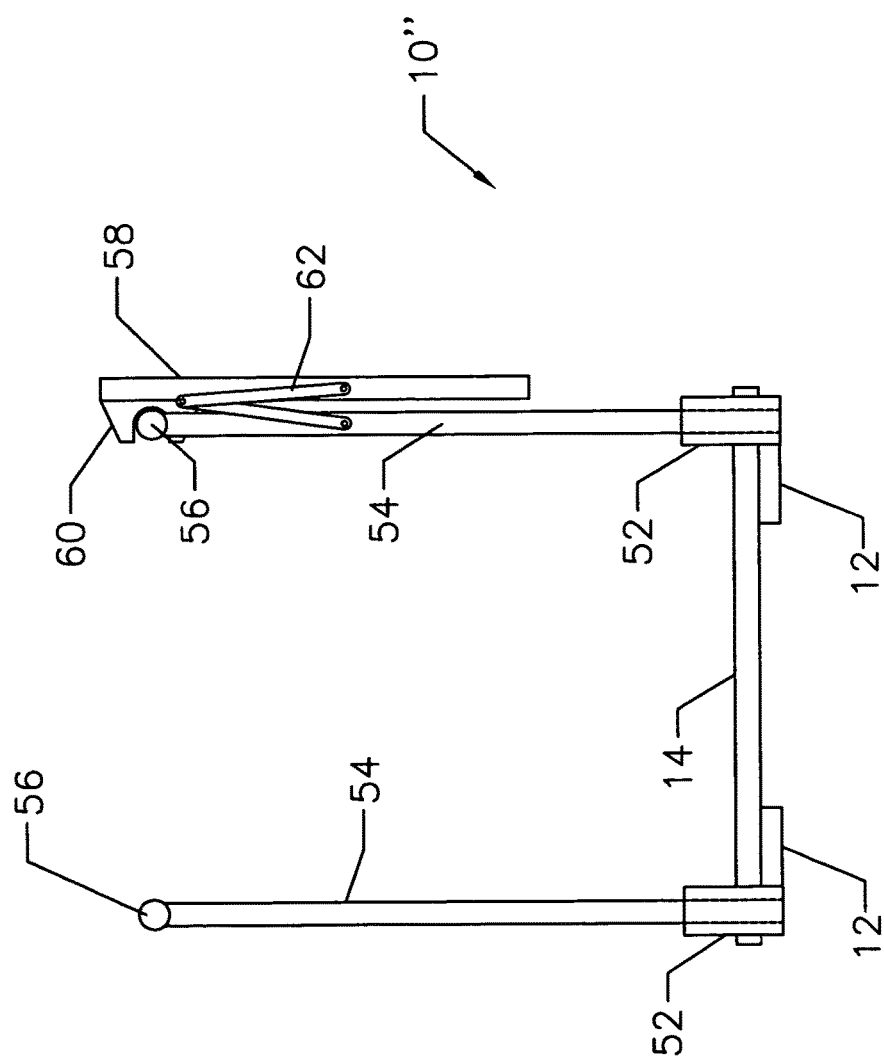
FIG. 29 is a front view in partial phantom of a service platform with safety rails and a tool tray in a retracted position according to the embodiment of the disclosure shown in FIG. 28.
Figure 30:
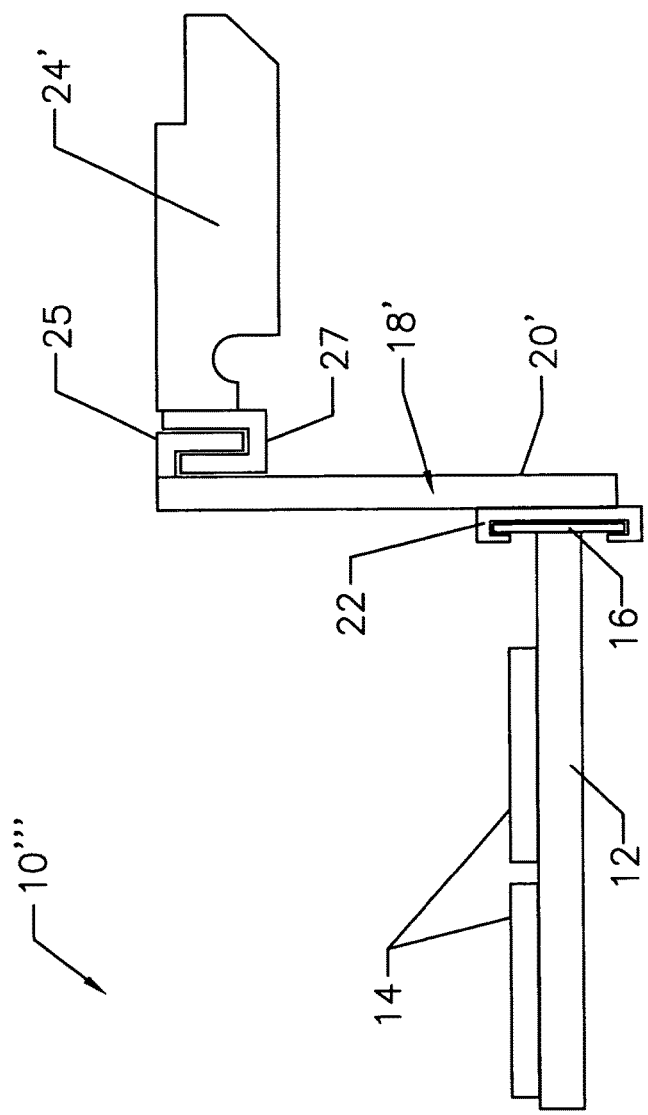
FIG. 30 is a side elevational view of a service platform assembly according to a further embodiment of the disclosure.
Figure 31:
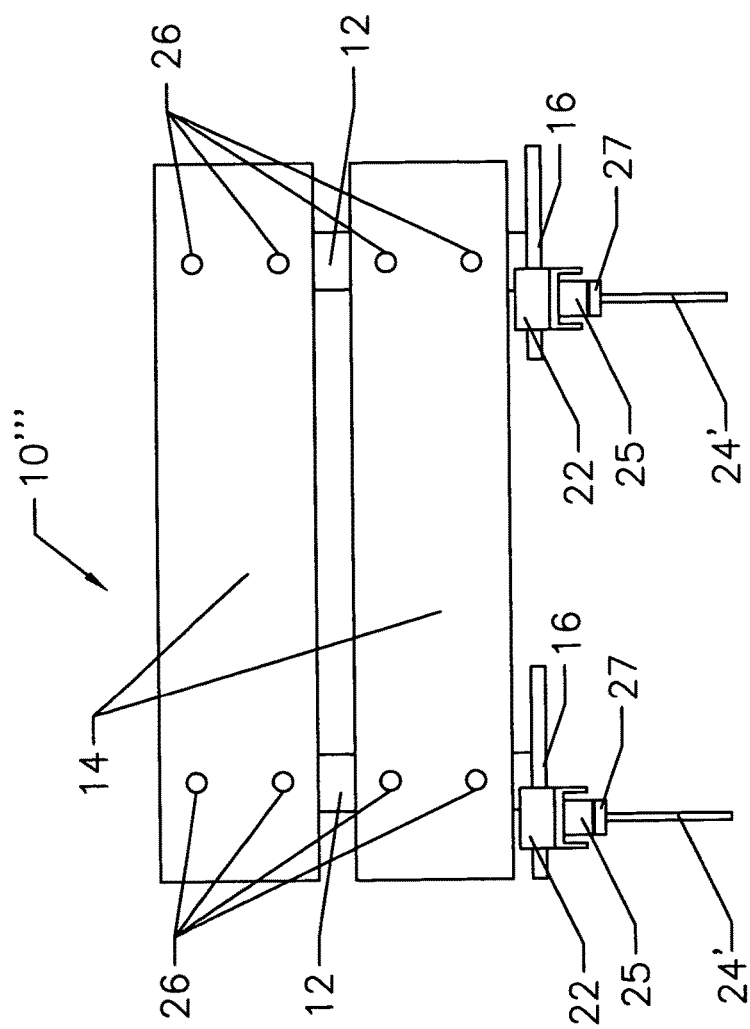
FIG. 31 is a top view of a platform subassembly according to the embodiment of the disclosure shown in FIG. 30.
Figure 32:
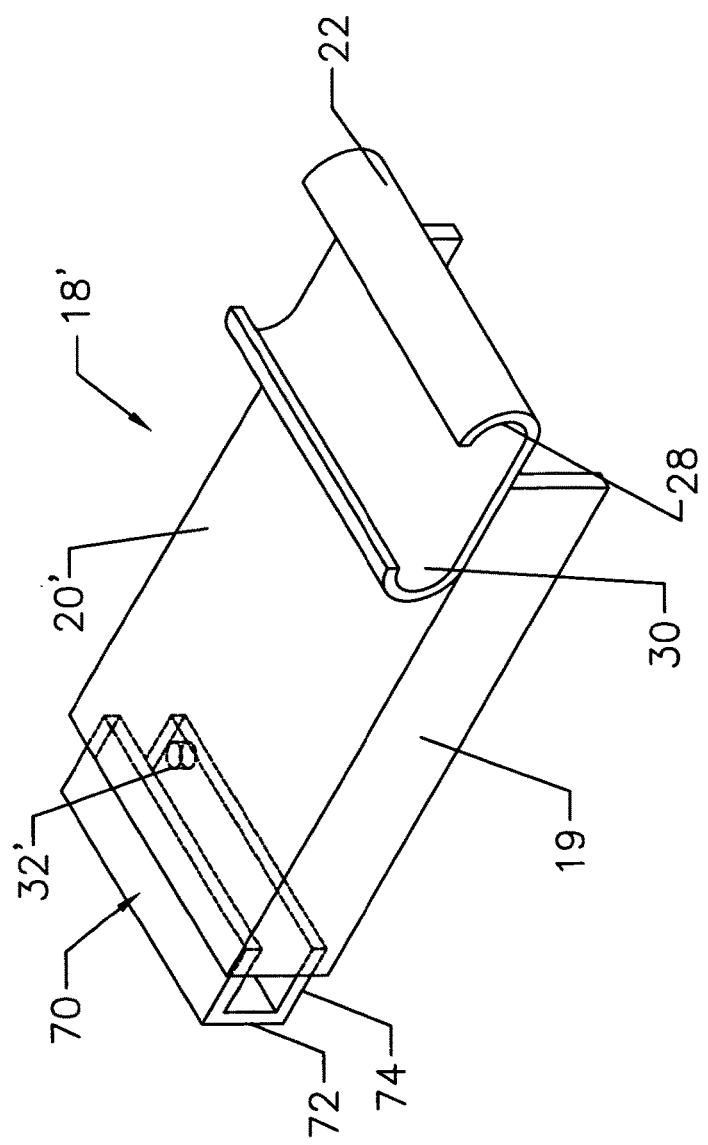
FIG. 32 is a top side perspective view of a platform support according to the embodiment of the disclosure shown in FIG. 30.

To add further versatility to the assembly, generally referred to as 10''', a tool tray 58 may be secured to one or more rails 56 (as shown in FIGS. 12, 13 and 28), to provide a support surface for holding tools to be used to service a pickup truck. Tray 58 is secured to rails 56 with one or more mounting brackets 60. Brackets 60 may be configured to allow for the rotation of tool tray 58 about rail 56 from a storage position (shown in FIG. 28), to a use position (shown in FIGS. 12 and 13). This may be accomplished with the addition of bearings, or by constructing the brackets from a material having a lubricious surface. In a use position, one or more articulated hinges 62 may be used to support the end of the tray distal from rail 56. Hinges 62 are secured at one end to post 54 and at the other end to either a side of tray 58 near the distal end, or to an auxiliary tool tray rail (not shown) secured to either the sides or bottom of tray 58 to receive hinges 62.

Figure 14:
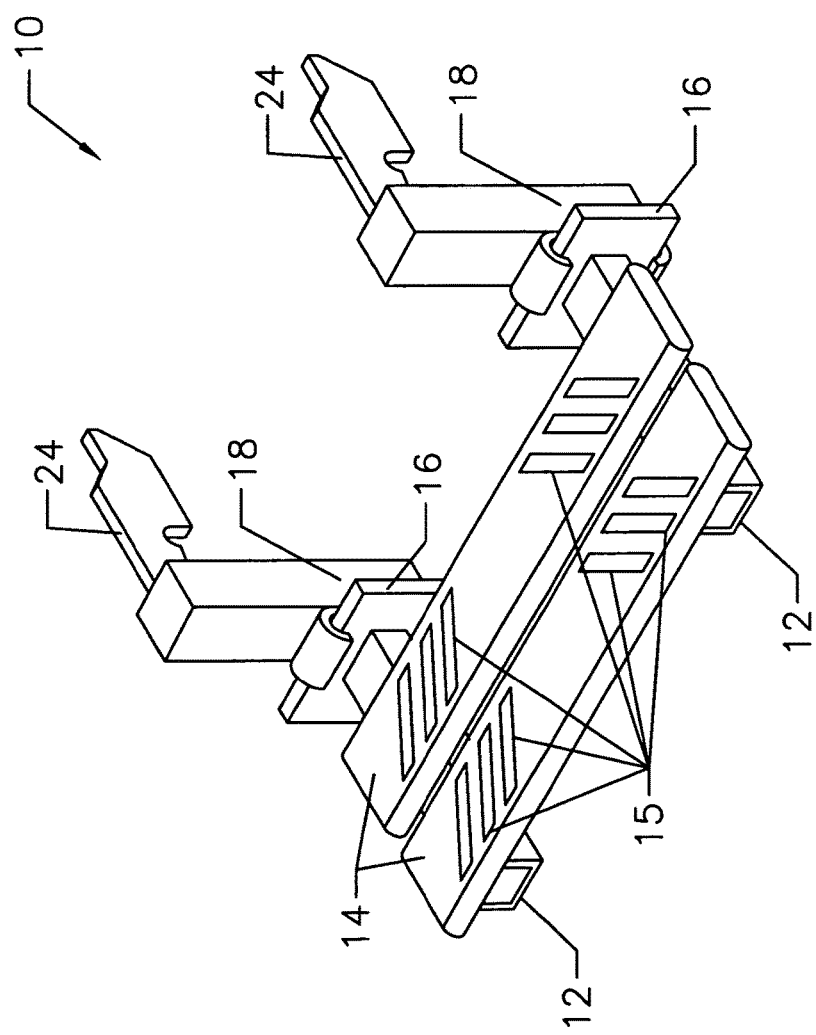
FIG. 14 is a top perspective view at a service platform assembly according to the embodiment of the disclosure shown in FIG. 1.
Figure 15:
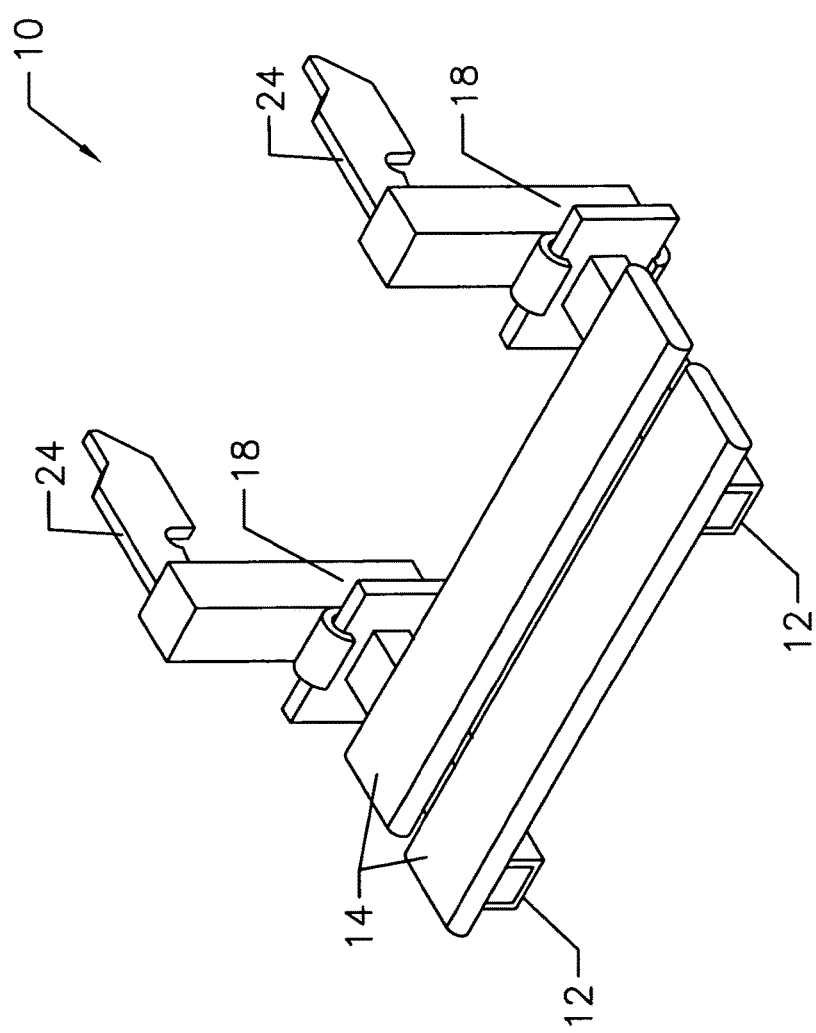
FIG. 15 is a top front perspective view of a service platform assembly according to the embodiment of the disclosure shown in FIG. 1.
Figure 16:
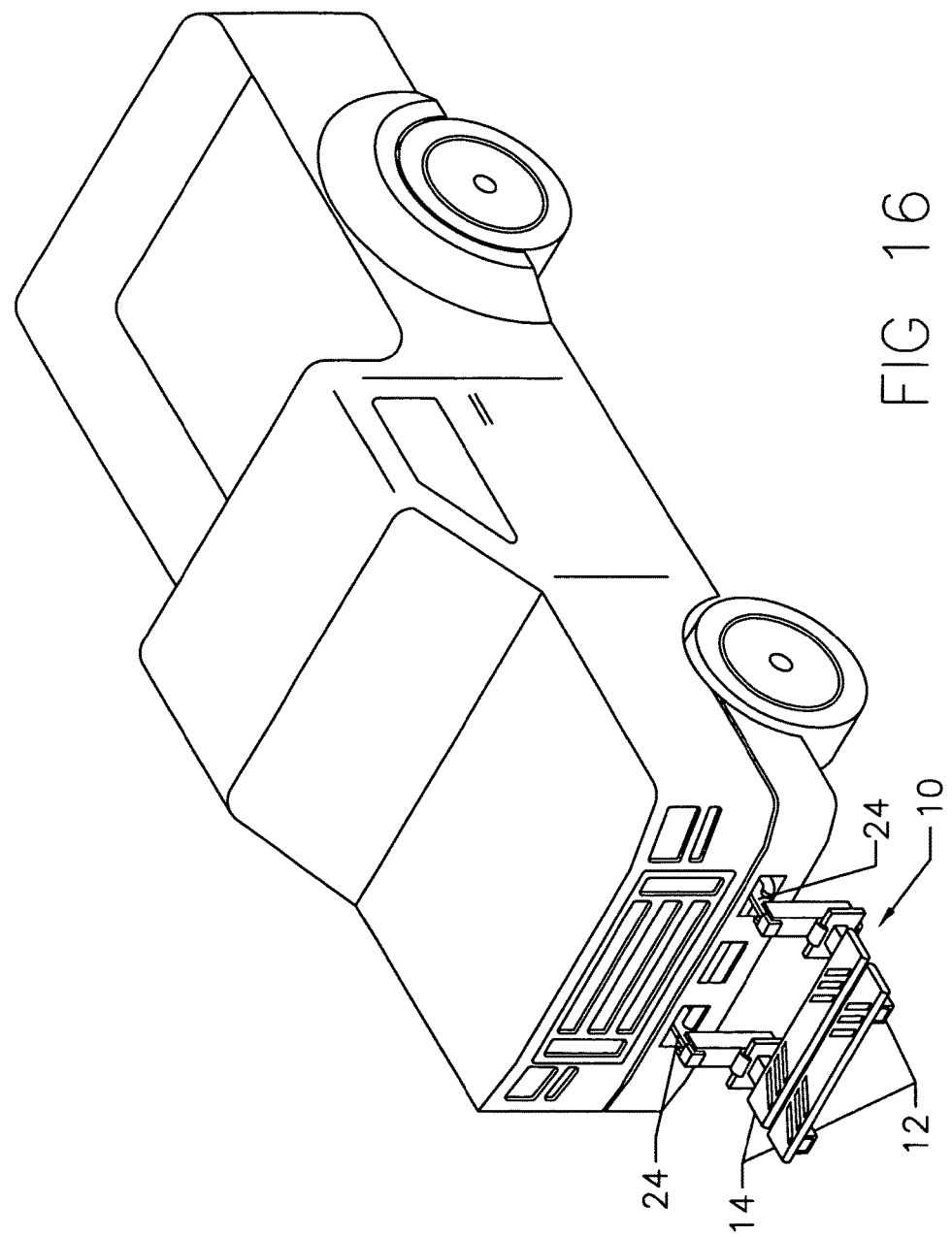
FIG. 16 is a top front perspective view of a service platform assembly assembled to a vehicle according to the embodiment of the disclosure shown in FIG. 1.
Figure 17:
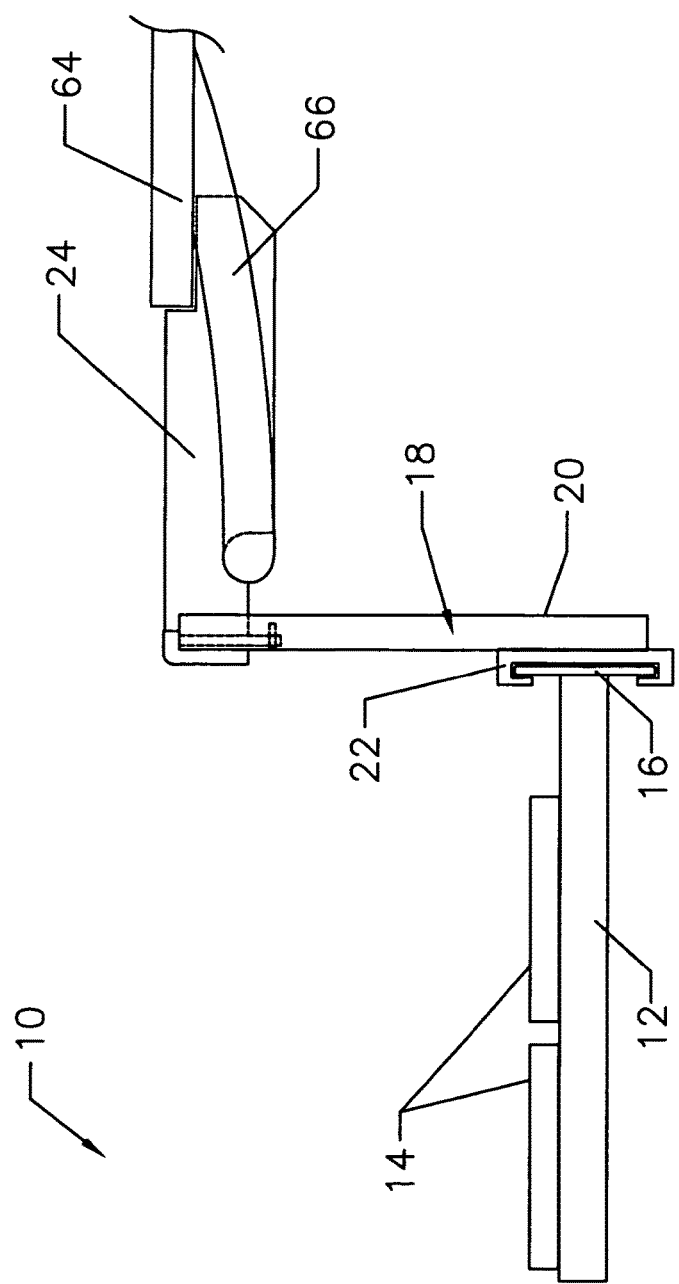
FIG. 17 is a side sectional view in partial phantom of a service platform assembly assembled to a vehicle tow hook assembly according to the embodiment of the disclosure shown in FIG. 1.
Figure 18:
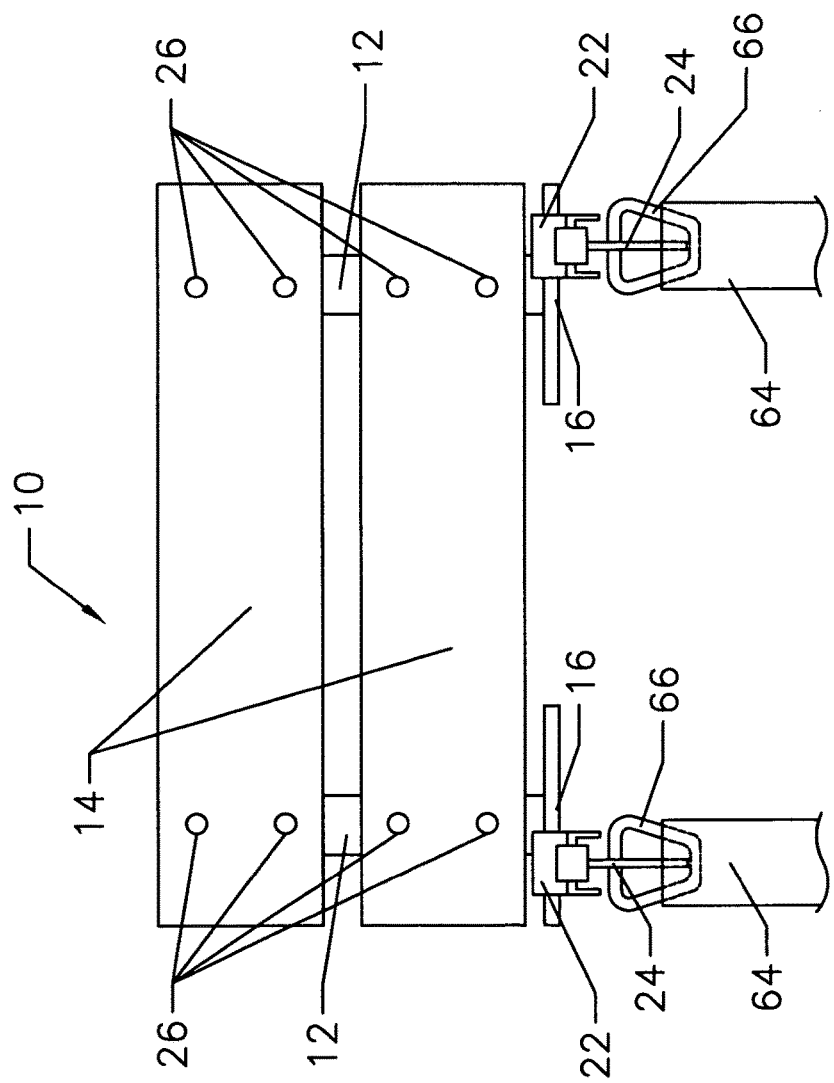
FIG. 18 is a top view in partial phantom of the service platform assembly assembled to a vehicle tow hook assembly according to the embodiment of the disclosure shown in FIG. 17.
Figure 19:
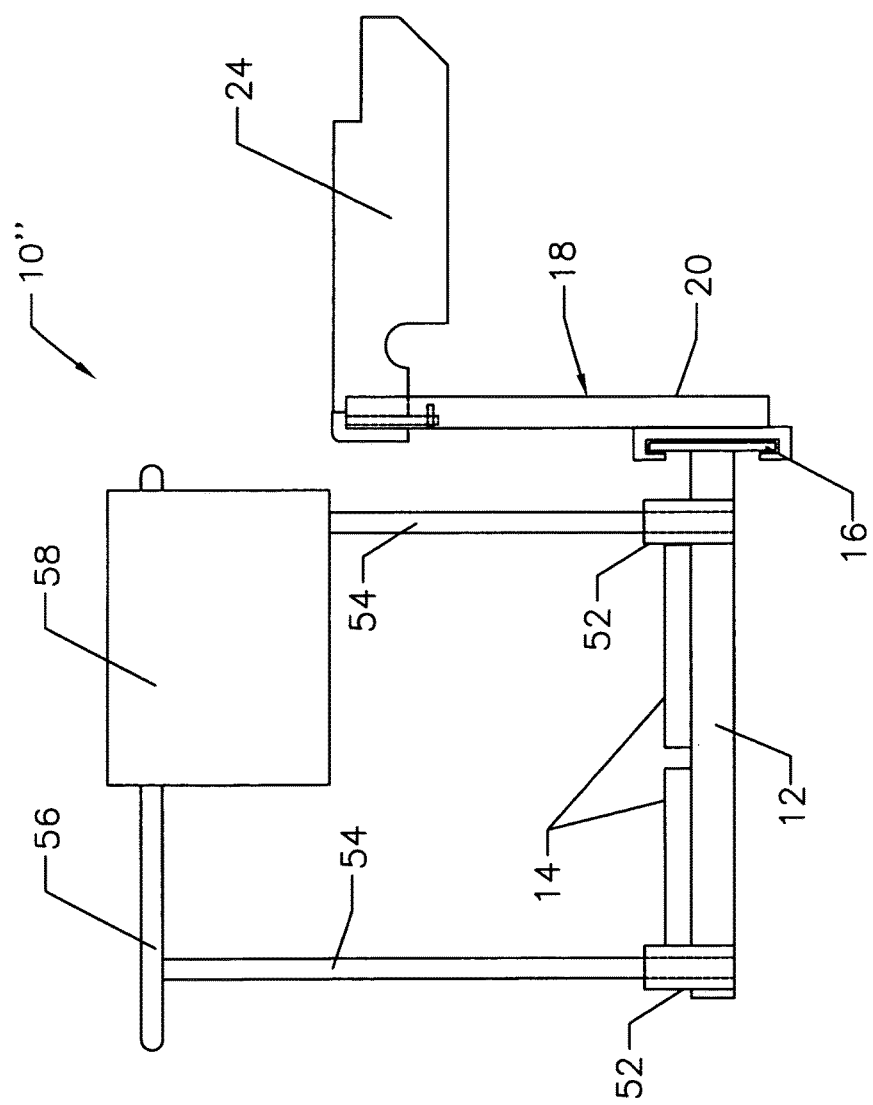
FIG. 19 is a side sectional view in partial phantom of a service platform assembly with safety rails and a tool tray in a retracted position according to the embodiment of the disclosure shown in FIG. 12.
Figure 20:
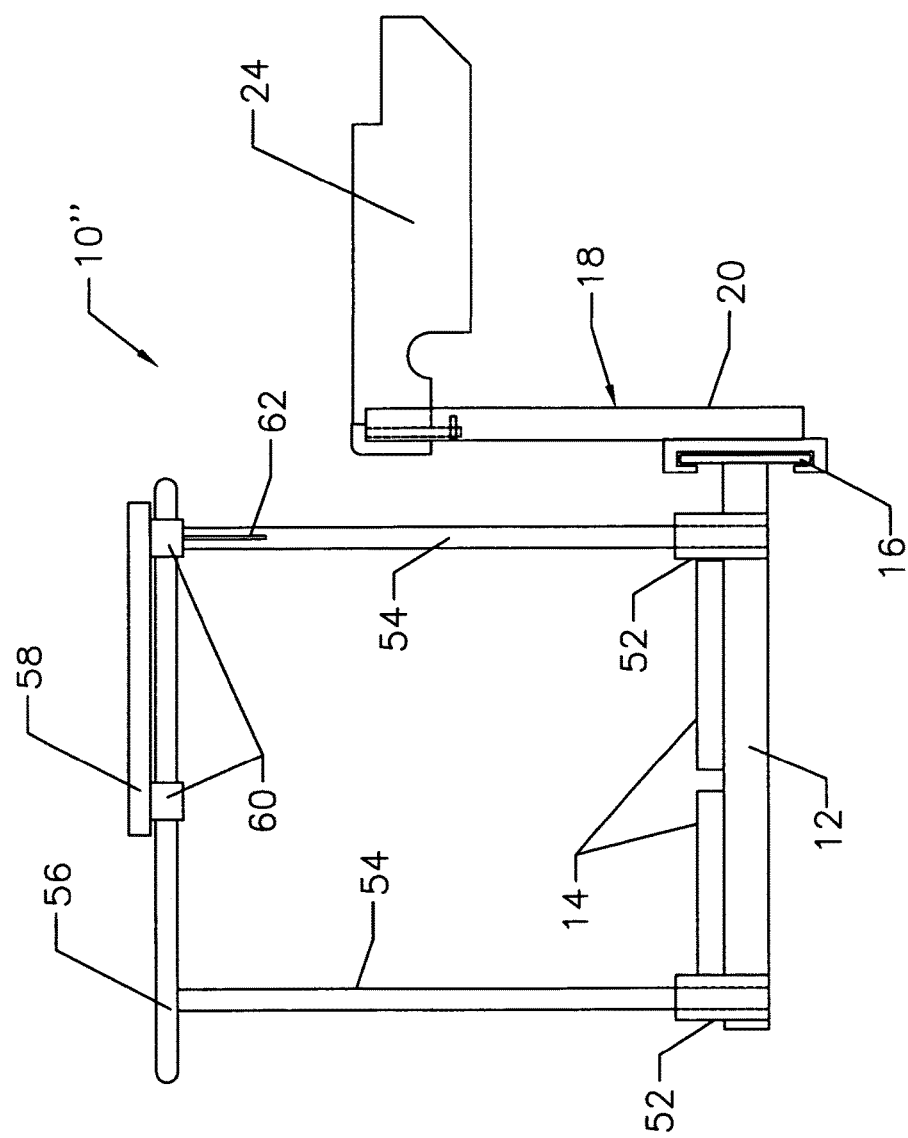
FIG. 20 is a side sectional view in partial phantom of a service platform assembly with safety rails and a tool tray in an extended position according to the embodiment of the disclosure shown in FIG. 13.
Figure 21:
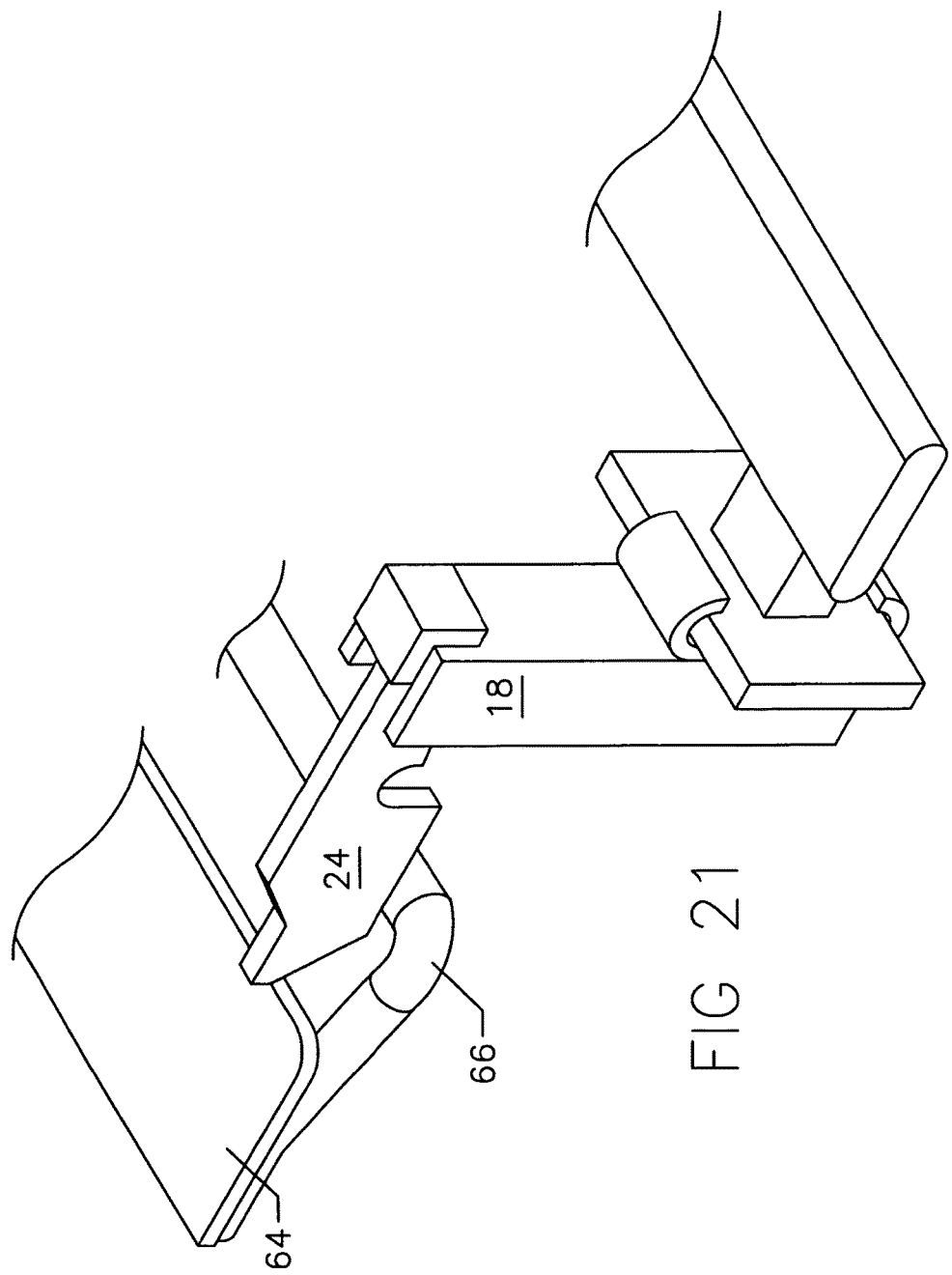
FIG. 21 is a pictorial illustration of a combined platform support and platform hanger being inserted into a vehicle tow hook according to the embodiment of the disclosure shown in FIG. 1.
Figure 22:
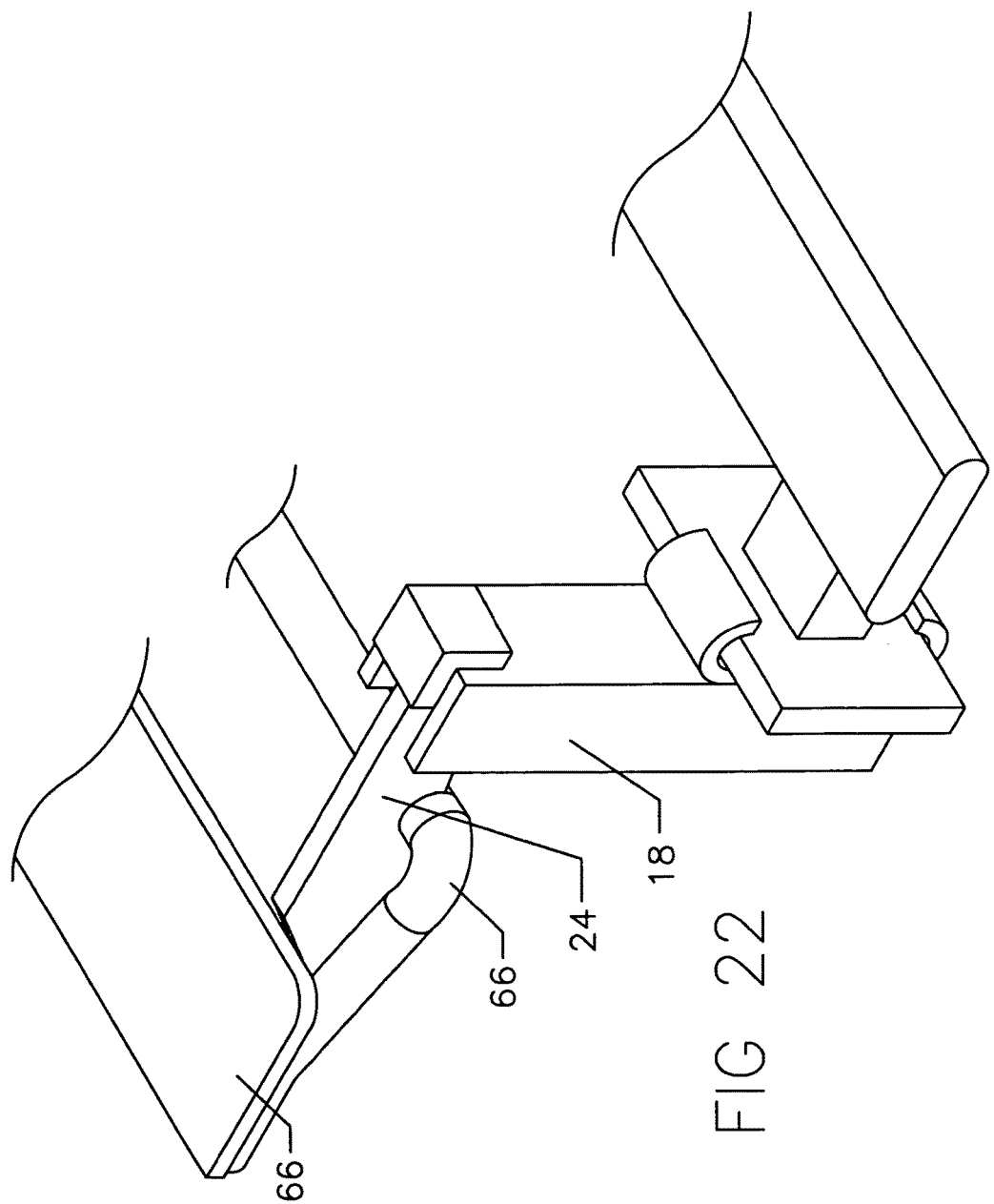
FIG. 22 is a pictorial illustration of a combined platform support and platform hanger assembled to a vehicle tow hook according to the embodiment of the disclosure shown in FIG. 1.
Figure 23:
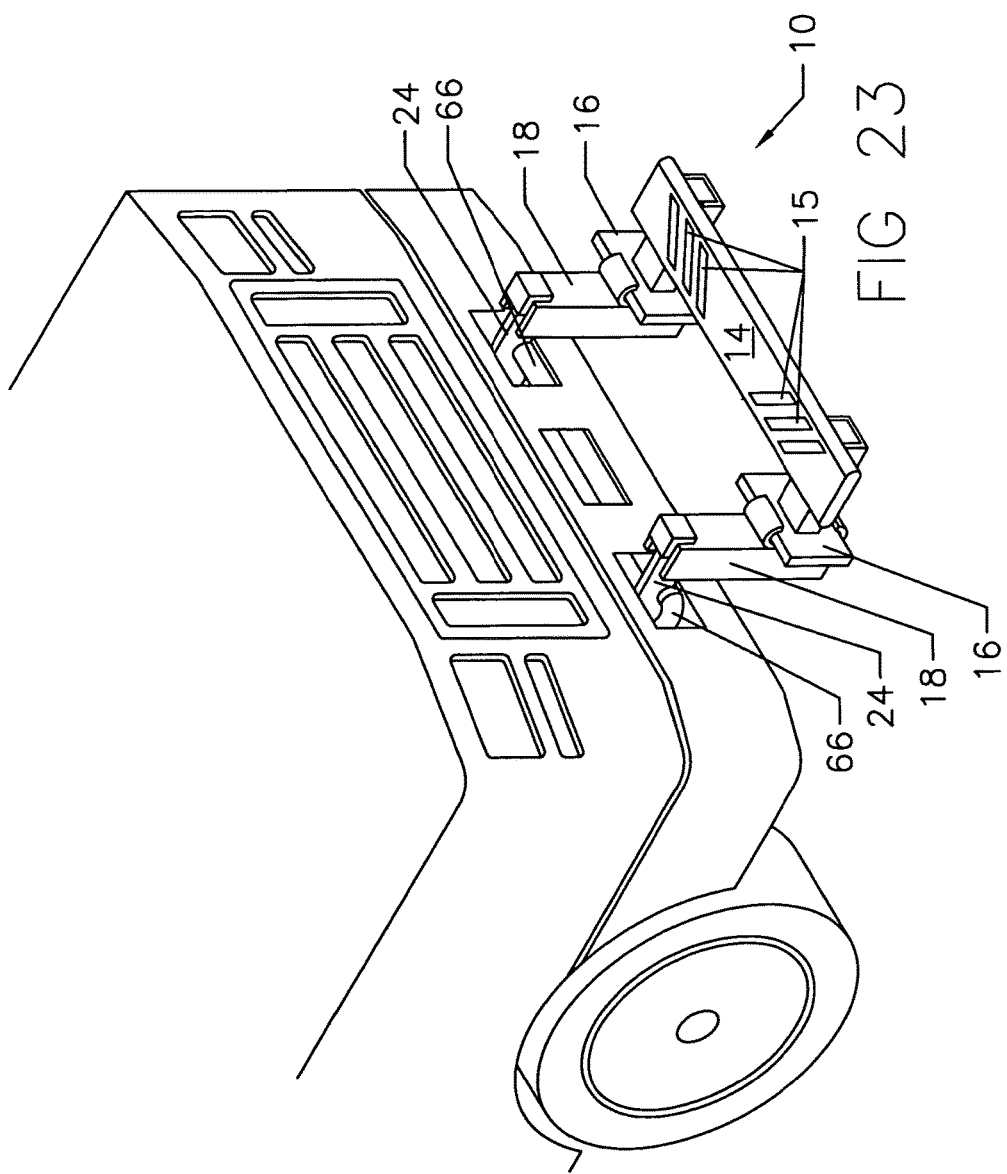
FIG. 23 is a pictorial illustration of a service platform assembly assembled to a vehicle according to the embodiment of the disclosure shown in FIG. 1.
Figure 24:
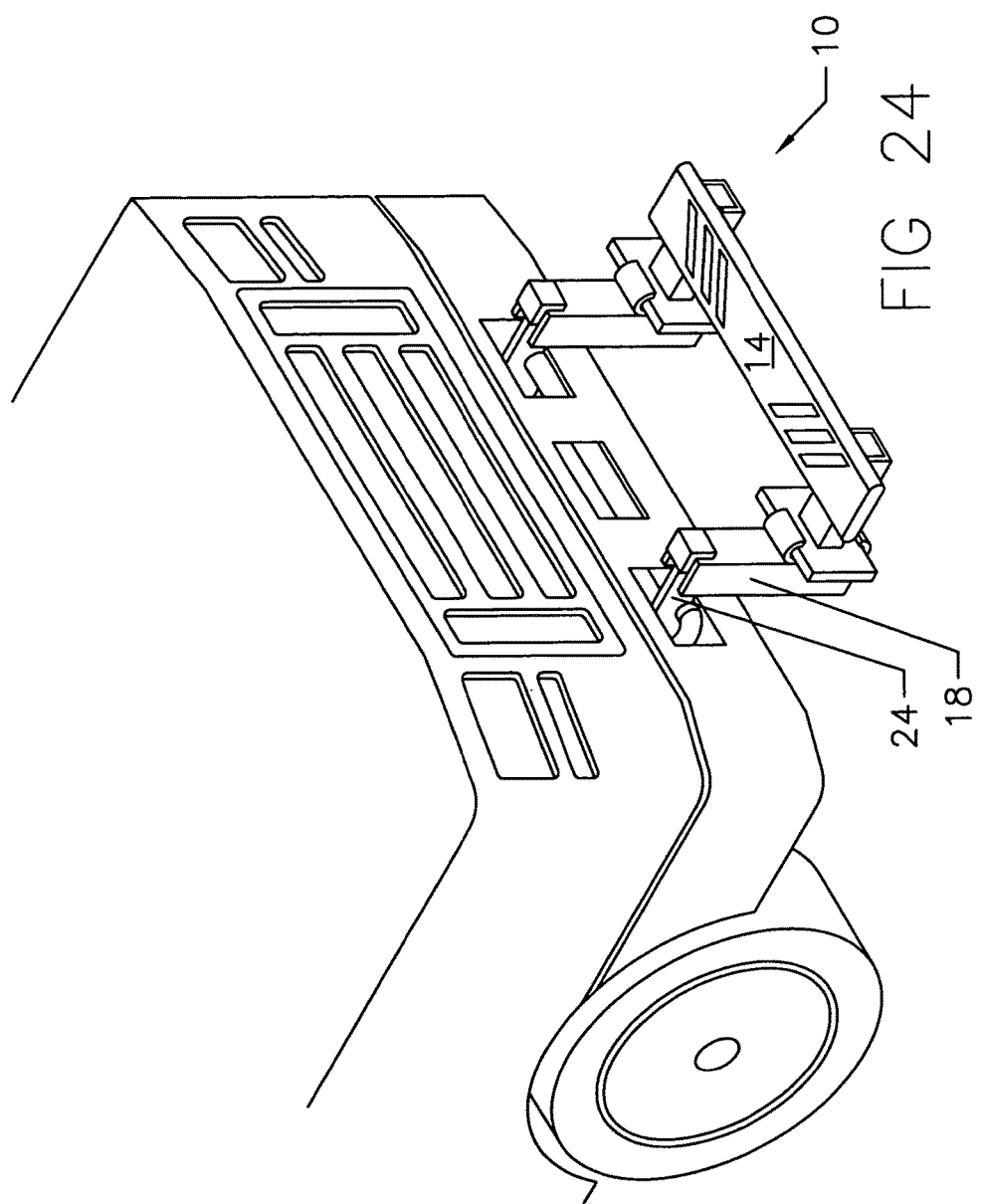
FIG. 24 is a distant pictorial illustration of a service platform assembly assembled to a vehicle according to the embodiment of the disclosure shown in FIG. 1.
Figure 25:
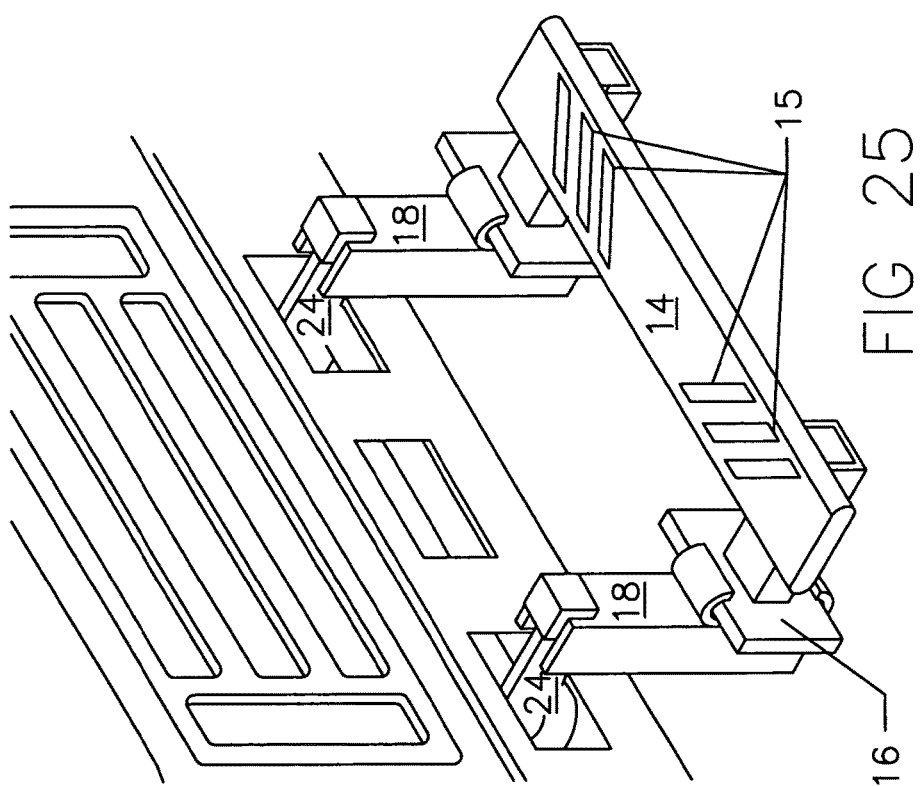
FIG. 25 is close-up pictorial illustration of a service platform assembly assembled to a vehicle according to the embodiment of the disclosure shown in FIG. 1.
Figure 26:
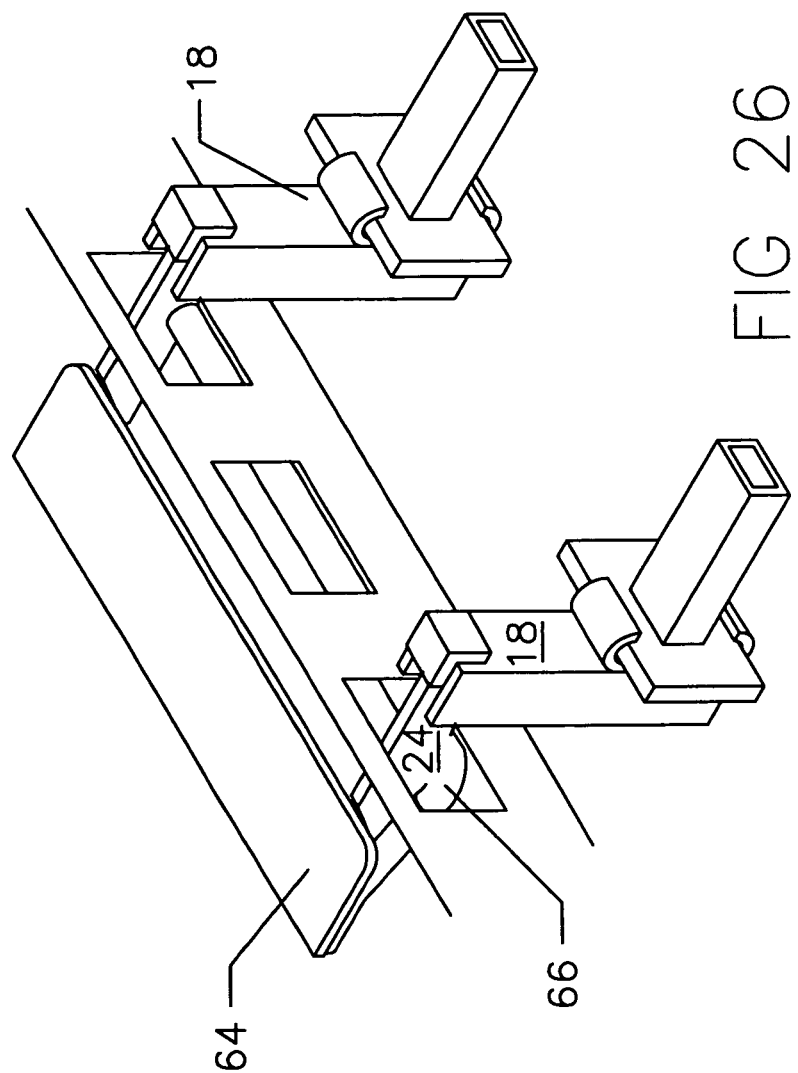
FIG. 26 is a close-up pictorial illustration of an assembled platform support and platform hanger subassembly secured to a tow hook of a vehicle according to the embodiment of the disclosure shown in FIG. 1.
Figure 27:
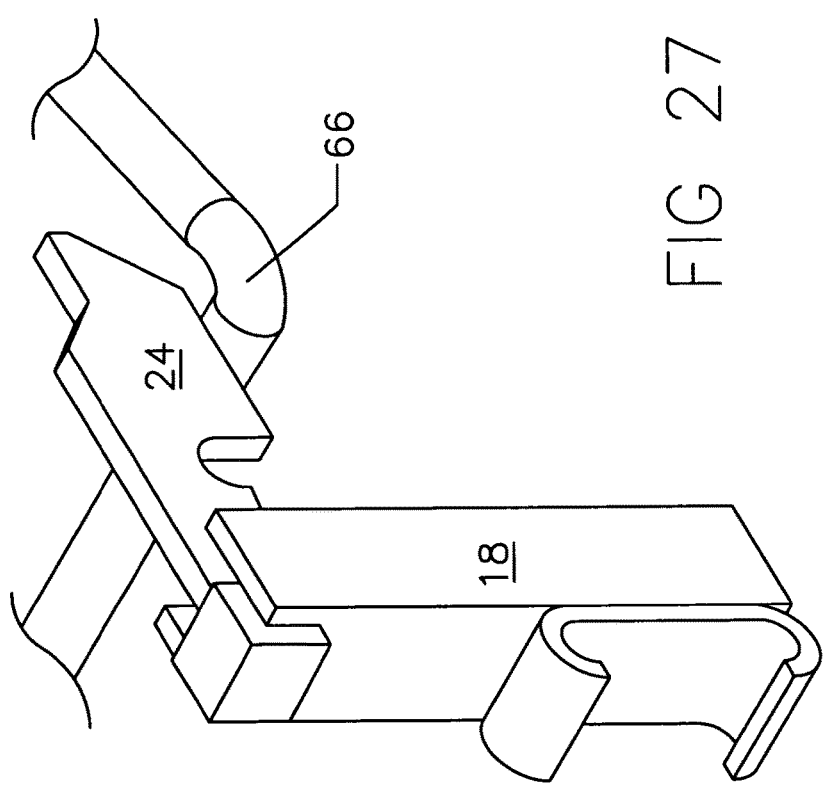
FIG. 27 is a close-up pictorial illustration of a platform support and platform hanger subassembly being secured to a tow hook of a vehicle according to the embodiment of the disclosure shown in FIG. 1.

As a further safety measure, friction strips 15 may be secured to the top surfaces of treads 14 to provide a substantially slip resistant surface to the assembly as shown in FIG. 14. The friction strips may have a sand-paper like top surface and an adhesive backing for securing strips 15 to treads 14.

To assemble and operate the assembly, the appropriate version of insert 24 is assembled to the corresponding embodiment of support bar 18 with pin 35 if required by the particular embodiment. Each insert/support bar subassembly is next assembled to slide plate 16 via insertion into channel 22. The assembled unit is now lifted and tilted to allow surface 40 to enter into the opening defined by tow hook 66. The service platform assembly is advanced forward and tilted downwardly so surface 40 registers against tow hook support beam 64 and surface 42 registers against tow hook 66. The assembly is now fully engaged and ready for use.

For embodiments with rails, the rail assemblies are secured to rails 12 as previously described. If telescopic, the concentric segments are extended to the desired height. For embodiments having a retractable step, the step may now be extended to facilitate platform access. For embodiments having a tool tray, the tray may be extended to its working position.

To remove the assembly from a vehicle, the accessories are retracted and removed as necessary. The assembly is now tilted upwardly so surface 40 disengages tow hook support beam 64 and surface 42 disengages tow hook 66. The assembly is now lifted so as to remove surface 40 from the opening defined by the two hook and moved away from the vehicle.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patent is:

1. A truck service access assembly comprising:
    a platform subassembly comprising two spaced apart rails, wherein each rail has a front end proximal to a vehicle when suspended from the vehicle and a back end distal from the vehicle, at least one tread secured to the two spaced apart rails, and two slide plates, each slide plate secured to the front end of one of the two rails so that each rail has a single, dedicated slide plate attached, and wherein the attachment of the at least one tread to the two spaced apart rails fixes the distance between the rails;
    a suspension subassembly secured to the platform subassembly comprising two vertically-oriented support bars and two tow hook inserts, wherein each support bar has a beam and portions defining a slide-plate-receiving channel, wherein each slide-plate-receiving channel comprises an elongate top flange and an elongate bottom flange that partially define each channel, wherein each channel is dimensioned to receive and permit a single dedicated slide plate to register within the channel and permit lateral translation of the slide plate relative to the channel; wherein each of the two tow hook inserts has a tow hook insert main body having a proximal end and a distal end, and wherein the distal end of the main body has portions defining a vehicle frame engagement surface for registration against a bottom surface of a vehicle tow hook.

2. The assembly of claim 1 wherein the two tow hook inserts each include a base plate secured to a proximal end of the two hook insert main body and an insert flange secured to a top end of each base plate wherein the insert flange has a downwardly directed segment, wherein the base plate and the insert flange define a slot dimensioned to receive a top end of one of the two support bars.

3. The assembly of claim 2 wherein each of the two tow hook inserts has portions defining a plate through bore and each of the two support bars has portions defining a beam through bore each dimensioned to correspond to one of the least two tow hook insert plate through bores, and wherein the assembly further comprises at least one pin dimensioned to slide within one pair of the plate through bores and beam through bores to lock one of the two support bars and one of the tow hook inserts together.

4. The assembly of claim 1 wherein one of the two slide plates further comprises a stop to restrict lateral movement of the slide plate within its dedicated slide-plate-receiving channel.

5. The assembly of claim 1 wherein one of the two slide plates further comprises a tab that mechanically locks to a notch formed in its dedicated and corresponding slide-plate-receiving channel to restrict movement of the slide plate in the channel.

6. The assembly of claim 1 wherein the beams of the two supports bars comprise lateral flanges.

7. The assembly of claim 1 wherein each tow hook vehicle frame engagement surface is coated with a force absorbing material.

8. The assembly of claim 1 wherein the two tow hooks each further comprise a hook engagement surface formed on a bottom surface of each of the two hook main bodies, wherein the hook engagement surfaces register against a top surface of a vehicle tow hook.

9. The assembly of claim 8 wherein each hook engagement surface is coated with a force absorbing material.

10. The assembly of claim 1 further comprising at least one friction strip secured to a top surface of the at least one tread.

11. The assembly of claim 3 further comprising at least one safety rail secured to at least one of the parallel rails.

12. The assembly of claim 11 further comprising a tool tray secured to the at least one safety rail.

13. The assembly of claim 1 further comprising a retractable and extendable extension step secured to the parallel rails.

14. The assembly of claim 13 wherein the extension step is secured to the parallel rails with hinged supports to permit retraction from, and extension to, the platform subassembly.

15. The assembly of claim 1 wherein the tow hook insert comprises a back plate configured as a "J" hook in cross section secured to a proximal end of the insert and wherein the support bar has a flange hook secured to a top end wherein the flange has a downwardly extending segment, wherein the combination of the support bar and flange define a slot dimensioned and configured to receive a short arm of the "J" hook-shaped back plate, wherein the registration of the flange to the back plate secures the support bar to the tow hook insert.

* * * * *